(12) United States Patent  (10) Patent No.: US 8,725,768 B2
Jones  (45) Date of Patent: May 13, 2014

(54) METHOD, SYSTEM, AND COMPUTER READABLE STORAGE FOR AFFILIATE GROUP SEARCHING

(75) Inventor: Scott A Jones, Carmel, IN (US)

(73) Assignee: ChaCha Search, Inc., Carmel, IN (US)

( * ) Notice: Subject to any disclaimer, the term of this patent is extended or adjusted under 35 U.S.C. 154(b) by 290 days.

(21) Appl. No.: 12/857,181

(22) Filed: Aug. 16, 2010

(65) Prior Publication Data

US 2012/0143862 A1   Jun. 7, 2012

Related U.S. Application Data

(63) Continuation of application No. 11/834,911, filed on Aug. 7, 2007, now Pat. No. 7,801,879.

(60) Provisional application No. 60/821,612, filed on Aug. 7, 2006.

(51) Int. Cl.
*G06F 7/00* (2006.01)
*G06F 17/30* (2006.01)

(52) U.S. Cl.
USPC .......................................................... 707/781

(58) Field of Classification Search
None
See application file for complete search history.

(56) References Cited

U.S. PATENT DOCUMENTS

| | | | |
|---|---|---|---|
| 5,559,940 A | 9/1996 | Hutson | |
| 5,732,259 A | 3/1998 | Konno | |
| 5,862,223 A | 1/1999 | Walker | |
| 5,867,799 A | 2/1999 | Lang et al. | |
| 5,875,231 A | 2/1999 | Farfan et al. | |
| 5,915,010 A | 6/1999 | McCalmont | |
| 5,918,010 A | 6/1999 | Appleman | |
| 6,023,586 A | 2/2000 | Gaisford et al. | |
| 6,026,148 A | 2/2000 | Dworkin et al. | |
| 6,081,788 A | 6/2000 | Appleman | |
| 6,115,709 A | 9/2000 | Gilmour et al. | |
| 6,157,926 A | 12/2000 | Appleman | |
| 6,195,681 B1 | 2/2001 | Appleman | |
| 6,205,472 B1 | 3/2001 | Gilmour | |
| 6,226,648 B1 | 5/2001 | Appleman | |
| 6,253,202 B1 | 6/2001 | Gilmour | |
| 6,308,175 B1 | 10/2001 | Lang et al. | |
| 6,314,420 B1 | 11/2001 | Lang | |
| 6,327,590 B1 | 12/2001 | Chidlovskii et al. | |
| 6,336,132 B2 | 1/2002 | Appleman | |

(Continued)

FOREIGN PATENT DOCUMENTS

EP   1 193 625   4/2002
JP   2001-202390   7/2001

(Continued)

OTHER PUBLICATIONS

Office Action dated May 14, 2010, issued in corresponding U.S. Appl. No. 11/834,911.

(Continued)

*Primary Examiner* — Taelor Kim

(57) ABSTRACT

A method for allowing an information seeker to utilize affiliate group searching involving human searchers who are members of particular information affiliate groups. Each affiliate group has an area of expertise in which they are particularly skilled. In at least one embodiment, the method includes accepting designation of an affiliate group for providing information searching and presenting search results produced by a member of the affiliate group to an information seeker.

17 Claims, 17 Drawing Sheets

(56) References Cited

U.S. PATENT DOCUMENTS

| | | | |
|---|---|---|---|
| 6,377,949 | B1 | 4/2002 | Gilmour |
| 6,405,197 | B2 | 6/2002 | Gilmour |
| 6,421,669 | B1 | 7/2002 | Gilmour et al. |
| 6,430,558 | B1 | 8/2002 | Delano |
| 6,507,841 | B2 | 1/2003 | Riverieulx de Varax |
| 6,578,010 | B1 | 6/2003 | Teacherson |
| 6,601,061 | B1 | 7/2003 | Holt et al. |
| 6,640,229 | B1 | 10/2003 | Gilmour et al. |
| 6,647,383 | B1 | 11/2003 | August |
| 6,647,384 | B2 | 11/2003 | Gilmour |
| 6,675,159 | B1 | 1/2004 | Lin et al. |
| 6,691,159 | B1 | 2/2004 | Grewal |
| 6,732,088 | B1 | 5/2004 | Glance |
| 6,745,178 | B1 | 6/2004 | Emens |
| 6,775,664 | B2 | 8/2004 | Lang |
| 6,829,585 | B1 | 12/2004 | Grewal |
| 6,873,982 | B1 | 3/2005 | Bates |
| 6,877,034 | B1 | 4/2005 | Machin |
| 6,895,406 | B2 | 5/2005 | Fables et al. |
| 6,901,394 | B2 | 5/2005 | Chauhan et al. |
| 6,941,372 | B2 | 9/2005 | Pearson |
| 6,947,924 | B2 | 9/2005 | Bates |
| 6,952,678 | B2 | 10/2005 | Williams |
| 6,970,879 | B1 | 11/2005 | Gilmour |
| 7,020,679 | B2 | 3/2006 | Tian |
| 7,032,115 | B2 | 4/2006 | Kashani |
| 7,203,725 | B1 | 4/2007 | Gilmour et al. |
| 7,865,457 | B2 * | 1/2011 | Ravin et al. ............ 706/46 |
| 2001/0009013 | A1 | 7/2001 | Appleman |
| 2002/0062343 | A1 | 5/2002 | Appleman |
| 2002/0087520 | A1 | 7/2002 | Meyers |
| 2002/0120609 | A1 | 8/2002 | Lang |
| 2002/0120619 | A1 | 8/2002 | Marso |
| 2002/0140715 | A1 | 10/2002 | Smet |
| 2002/0167539 | A1 | 11/2002 | Brown et al. |
| 2002/0198766 | A1 * | 12/2002 | Magrino et al. ............ 705/11 |
| 2003/0004909 | A1 * | 1/2003 | Chauhan et al. ............ 706/45 |
| 2003/0131000 | A1 | 7/2003 | Bates et al. |
| 2003/0140037 | A1 | 7/2003 | Deh-Lee |
| 2003/0142797 | A1 | 7/2003 | Troy et al. |
| 2003/0145001 | A1 | 7/2003 | Craig et al. |
| 2003/0174818 | A1 | 9/2003 | Hazenfield |
| 2003/0198325 | A1 | 10/2003 | Bayne |
| 2003/0208535 | A1 | 11/2003 | Appleman |
| 2003/0220919 | A1 | 11/2003 | Tsitas |
| 2004/0023644 | A1 | 2/2004 | Montemer |
| 2004/0024752 | A1 | 2/2004 | Manber et al. |
| 2004/0049541 | A1 | 3/2004 | Swahn |
| 2004/0093325 | A1 | 5/2004 | Banerjee et al. |
| 2004/0203634 | A1 | 10/2004 | Wang et al. |
| 2004/0205065 | A1 | 10/2004 | Petras et al. |
| 2004/0210550 | A1 | 10/2004 | Williams |
| 2004/0210661 | A1 | 10/2004 | Thompson |
| 2004/0230572 | A1 | 11/2004 | Omoigui |
| 2004/0254920 | A1 | 12/2004 | Brill |
| 2005/0033761 | A1 | 2/2005 | Guttman |
| 2005/0086290 | A1 | 4/2005 | Joyce et al. |
| 2005/0105712 | A1 | 5/2005 | Williams et al. |
| 2005/0131866 | A1 | 6/2005 | Badros |
| 2005/0136949 | A1 | 6/2005 | Barnes, Jr. |
| 2005/0165780 | A1 | 7/2005 | Omega |
| 2005/0187895 | A1 | 8/2005 | Paya |
| 2005/0198116 | A1 | 9/2005 | Appleman |
| 2005/0203800 | A1 | 9/2005 | Sweeney et al. |
| 2005/0210042 | A1 | 9/2005 | Goedken |
| 2005/0222975 | A1 | 10/2005 | Nayak |
| 2005/0246358 | A1 | 11/2005 | Gross |
| 2005/0289124 | A1 | 12/2005 | Kaiser et al. |
| 2006/0004713 | A1 | 1/2006 | Korte |
| 2006/0010105 | A1 | 1/2006 | Sarukkai et al. |
| 2006/0015488 | A1 | 1/2006 | Perisic |
| 2006/0020593 | A1 | 1/2006 | Ramsaier et al. |
| 2006/0047615 | A1 * | 3/2006 | Ravin et al. ............ 706/50 |
| 2006/0064404 | A1 | 3/2006 | Kishore |
| 2006/0069674 | A1 | 3/2006 | Palmon |
| 2006/0074863 | A1 | 4/2006 | Kishore |
| 2006/0195442 | A1 | 8/2006 | Cone et al. |
| 2006/0265361 | A1 | 11/2006 | Chu |
| 2006/0294085 | A1 | 12/2006 | Rose et al. |
| 2007/0005344 | A1 | 1/2007 | Sandor et al. |
| 2007/0005698 | A1 | 1/2007 | Kumar |
| 2007/0014537 | A1 | 1/2007 | Wesemann |
| 2007/0016563 | A1 | 1/2007 | Omoigui |
| 2007/0027859 | A1 | 2/2007 | Harney et al. |
| 2007/0043712 | A1 | 2/2007 | Ramberg |
| 2007/0050245 | A1 | 3/2007 | Humphries, IV et al. |
| 2007/0078803 | A1 | 4/2007 | Gilmour et al. |
| 2007/0081197 | A1 | 4/2007 | Omoigui |
| 2007/0100798 | A1 | 5/2007 | Kapur |
| 2007/0112761 | A1 | 5/2007 | Xu et al. |
| 2007/0136256 | A1 | 6/2007 | Kapur et al. |
| 2007/0198340 | A1 | 8/2007 | Lucovsky et al. |
| 2007/0208688 | A1 | 9/2007 | Bandhole et al. |
| 2007/0244872 | A1 | 10/2007 | Hancock |
| 2010/0030734 | A1 * | 2/2010 | Chunilal ............ 707/3 |

FOREIGN PATENT DOCUMENTS

| | | |
|---|---|---|
| JP | 2001-357068 | 12/2001 |
| WO | 2005/048078 | 5/2005 |
| WO | 2007/052285 | 5/2007 |
| WO | WO 2007/052285 | 5/2007 |

OTHER PUBLICATIONS

Office Action dated Jul. 8, 2009, issued in corresponding U.S. Appl. No. 11/834,911.

Office Action dated May 29, 2009, issued in corresponding U.S. Appl. No. 11/834,911.

Office Action dated Dec. 19, 2008, issued in corresponding U.S. Appl. No. 11/834,911.

International Search Report issued Jan. 28, 2008 in PCT/US07/75369.

International Search Report issued Feb. 12, 2008 in PCT/US07/60467.

International Search Report issued Feb. 27, 2008 in PCT/US07/60459.

International Search Report issued Feb. 15, 2008 in PCT/US07/60468.

International Search Report issued Feb. 7, 2008 in PCT/US07/60472.

Carmel et al., "Searching XML Documents via XML Fragments," 2003, ACM, pp. 151-158.

Karat et al., "Patterns of Entry and Correction in Large Vocabulary Continuous Speech Recognition Systems," 1999, ACM, pp. 568-575.

Google Tutor, "Googling from your Mobile Phone-no Web Browser Needed!," 2005, Google Tour.

Varshney et al., "Voice Over IP," 2002, Communications of the ACM, vol. 45, No. 1, pp. 89-96.

Knoblock, Craig A., "Searching the World Wide Web," 1997, IEEE Expert, pp. 8-14.

Sullivan, Danny, "Google Launches Personalized Home Page," Search Engine Watch, May 2005.

International Search Report issued Jun. 17, 2008 in PCT/US07/75356.

Patent Abstract of Taiwanese Patent Publication No. 548558B.

U.S. Appl. No. 11/834,911, filed Aug. 7, 2007, Scott Jones, ChaCha Search Inc.

* cited by examiner

INTEREST GROUP DATABASE 235

| | DESCRIPTION | EXAMPLE CONTENT(S) | | |
|---|---|---|---|---|
| 305 | INTEREST GROUP ID | 'AUDUBON SOCIETY' (N1122) | | |
| 310 | INTEREST GROUP RATING | A1 | B2 | 19 |
| 325 | RELATED KEYWORDS/CATEGORIES | OVERALL | 'NATURE' CATEGORY | 'ROBIN' KEYWORD |
| 315 | SEARCH SPECIALTY | 'BIRDS AND BIRDING' | | |
| 320 | ASSIGNED SEARCHERS | 'BILL BIRDSONG' (1143) ; 'ROBIN FINDER' (2167) ; 'FRED FINCH' (4433) | | |
| 330 | INTEREST GROUP RESULTS | 'BIRDS OF INDIANA' : 5 ; 'AUDUBON CLUB OF CALIFORNIA' : 10 | | |
| 335 | INTEREST GROUP QUERIES | 'WHAT BIRD HAS A RED HEAD AND NO TAIL' ; 'WHERE CAN I LEARN ABOUT BIRDING IN CALIFORNIA' | | |

INTEREST GROUP SEARCHER DATABASE

| | DESCRIPTION | EXAMPLE CONTENT(S) |
|---|---|---|
| 405 | SEARCHER ID | FRED FINCH (4433) |
| 410 | INTEREST GROUP ID | 'AUDUBON SOCIETY' (N1122) |
| | | 'INDIANA RIFLE CLUB' (N1492) |
| 415 | SEARCHER USERNAME | 'FRED FINCH' |
| | | 'FIREARM FRED' |
| 420 | SEARCHER VERIFICATION CODE | 'I LUV BIRDS' |
| | | 'BANGBANG' |
| 425 | SEARCHER RATING | '2' |
| | | 'NOVICE-4' |
| 435 | EXPERTISE WITHIN INTEREST GROUP | 'FINCHES', 'BIRD PHOTOGRAPHY' |
| | | 'SHOT GUNS' |
| 440 | DEMOGRAPHIC PROFILE DATA | MALE, GERMAN AMERICAN, DOB 10-10-1970 |
| 450 | GEOGRAPHIC LOCATION DATA | INDIANAPOLIS, INDIANA, 46210, IP ADDRESS = 99.22.401.33 |

FIG. 4

INTEREST GROUP AUTHORIZATION DATABASE

| | DESCRIPTION | EXAMPLE CONTENT(S) | | |
|---|---|---|---|---|
| 505 | INTEREST GROUP ID | 'AUDUBON SOCIETY' (N1122) | | |
| 510 | AUTH USERS ID | 'PAUL F' (U123) | 'BILL B' (U234) | 'BRAD B' (U352) |
| 515 | AUTH USERS USERNAME | 'PAUL 10' | 'BILL 20' | 'BRAD 1' |
| 520 | AUTH USERS PASSWORD | 'BIRD' | 'CANARY' | 'ROBIN2' |
| 525 | AUTH SEARCHERS ID | 'BILL BIRDSONG' (1143) | 'ROBIN FINDER' (2167) | 'FRED FINCH' (4433) |
| 530 | AUTH SEARCHERS USERNAME | WILLYB | 'REDROBIN' | 'FREDFINCH' |
| 535 | AUTH SEARCHERS PASSWORD | 'ABIRD' | 'RBIRD1' | 'ILUVBIRDS' |

INTEREST GROUP AUTHORIZATION DATABASE 245

| | DESCRIPTION | EXAMPLE CONTENT(S) | | |
|---|---|---|---|---|
| 505 | INTEREST GROUP ID | 'RARE & ENDANGERED' (N1123) | | |
| 510 | AUTH USERS ID | 'PAUL F' (U123) | 'BRAD B' (U352) | |
| 515 | AUTH USERS USERNAME | 'PAUL 10' | 'BRAD 1' | |
| 520 | AUTH USERS PASSWORD | 'BIRD' | 'ROBIN2' | |
| 525 | AUTH SEARCHERS ID | 'ROBIN FINDER' (2167) | | |
| 530 | AUTH SEARCHERS USERNAME | 'REDROBIN' | | |
| 535 | AUTH SEARCHERS PASSWORD | 'RBIRD1' | | |

FIG. 5A

 Registration          800                                    Contact Create Account Register  Quiz  Download  W-9  Keywords Fields in bold are required
Fields marked with (*) are required                    Already Registered? Sign In 805 — Account Information
- *User Name ⎯⎯⎯⎯⎯⎯⎯⎯⎯⎯⎯⎯⎯ 820
  Alpha Numbers (e.g. 0-9) combinations. No spaces or characters allowed
- *Password ⎯⎯⎯⎯⎯⎯⎯⎯⎯⎯⎯⎯⎯ 825
- * Confirm Password ⎯⎯⎯⎯⎯⎯⎯⎯ 830
- *Email ⎯⎯⎯⎯⎯⎯⎯⎯⎯⎯⎯⎯⎯⎯ 835

810 — Personal Information
- *First Name ⎯⎯⎯⎯⎯⎯⎯⎯⎯⎯ 840
- Middle Initial ⎯ 842
- *Last Name ⎯⎯⎯⎯⎯⎯⎯⎯⎯⎯⎯ 844
- *Gender ▼ 860  846
- *Phone Number
- *Address Line 1 ⎯⎯⎯⎯⎯⎯⎯⎯⎯ 848
- Address Line 2 ⎯⎯⎯⎯⎯⎯⎯⎯⎯ 850
- *City ⎯⎯⎯⎯⎯⎯⎯ 852
- *State ▼ 854
- *Postal Code ⎯ 856
- *Date of Birth ▼ ▼ ▼
                858

Areas of interest (check all that apply) — 862
- ☐ Art
- ☐ Business
- ☐ Computers
- ☐ Games
- ☐ Health
- ☐ Home
- ☐ Kids & Teens
- ☐ News
- ☐ Recreation
- ☐ Reference
- ☐ Regional
- ☐ Science
- ☐ Shopping
- ☐ Society
- ☐ Sports
- ☐ World Affiliate Groups ▼ — 864

Internet Connection Speed ▼ — 863

Terms of Service

815 —
ChaCha Guide Participation and Independent Contractor Agreement Last Updated and Effective: August 20, 2006

This ChaCha Guide Participation and Independent Contractor Agreement (the "Agreement") is a legal agreement between you and ChaCha (as defined below) and governs you and ChaCha's respective rights and obligations with respect to the ChaCha Service Platform (as defined below).

WHEN YOU REGISTER TO PROVIDE SERVICES THROUGHOUT THE CHACHA SERVICE PLATFORM YOU CERTIFY, REPRESENT AND WARRANT THAT: (1) YOU ARE AT LEAST 18 YEARS OLD AND ARE AUTHORIZED UNDER THE LAWS OF YOUR STATE AND THE UNITED STATES OF AMERICA TO ENTER INTO THIS AGREEMENT; (2) YOU HAVE THE AUTHORITY TO ENTER INTO THIS
— 872

- ☐ I am over 18
- ☐ I am authorized to work as an independent contractor in the USA
- ☐ I agree to abide by all ChaCha policies at all times
- ☐ I agree to the electronic transfer of funds
- ☐ I agree to all the terms and conditions of the ChaCha contract
— 874

Click 'Continue' for the next step    [ Continue >> ] — 895

Copyright © 2006 ChaCha Search, Inc. Experimental Use

FIG. 8

| 866 | 868 | 870 |
|---|---|---|
| Select a Sub-Category | Select a Keyword | Your Keywords |
| Click categories to expand them ① | Sort by Popular / Alphabetical ② | 31 Keywords / 19 Available ③ |
| ✢ Reference | ⊟ Classifieds | [$] computers ☒ |
| ✢ Regional | advertising agencys | Business > Accounting |
| ✢ Science | affordable dog walk | [$] dictionary ☒ |
| ⊟ Shopping | apartment for rent | Business > Directories |
|    Antiques and Collectibles | are ufos real | [$] employment ☒ |
|    Auctions | art supply stores | Business > Directories |
|    By Region | auction | [$] yellow pages ☒ |
|    Children | auto auction | Business > Directories |
|    Classifieds | autotrader | [$] hosting services ☒ |
|    Clothing | awesome | Business > Information Technology |
|    Consumer Electronics | bell | [$] free download ☒ |
|    Crafts | bentley | Games > Online |

Results 1 – 100 of 1,956 | Next >>

Filter by: [＿＿＿] [Apply] ❓

✢ Add Keyword

METHOD, SYSTEM, AND COMPUTER READABLE STORAGE FOR AFFILIATE GROUP SEARCHING

CROSS-REFERENCE TO RELATED APPLICATION

This application is related to and claims the benefit of priority to Provisional Application U.S. Ser. No. 60/821,612, entitled "METHOD, SYSTEM, AND COMPUTER READABLE STORAGE FOR AFFILIATE GROUP SEARCHING", by Scott A. Jones, filed Aug. 7, 2006 and application U.S. Ser. No. 11/834,911, entitled "METHOD, SYSTEM, AND COMPUTER READABLE STORAGE FOR AFFILIATE GROUP SEARCHING", by Scott A. Jones, filed Aug. 7, 2007 in the U.S. Patent and Trademark Office, the contents of both is incorporated herein by reference.

BACKGROUND

1. Field

The embodiments discussed herein relate, generally, to information searching, and more specifically, to a method for information searching employing human searchers belonging to affiliate groups.

2. Description of the Related Art

In an information searching system including human searchers or guides, such as described in application Ser. No. 11/336,928, entitled, "A Scalable Search System Using Human Searchers", by Scott A. Jones, filed Jan. 23, 2006 incorporated by reference herein, the information searching may be divided according to keywords and/or categories. Such organization is often necessary due to the vast amount of information that can be searched to enable the information to be managed in an efficient manner. For example, a first information searcher may be responsible for performing any searching related to a first keyword, and a second information searcher may be responsible for performing any searching related to a second keyword.

Although organizing the searchers according to keywords and categories can allow them to become knowledgeable in searching information pertaining to the assigned keyword(s) or category(ies), the knowledge gained is often not enough to allow the searchers to become "expert" searchers, due to the vastness of the information pertaining to the category(ies) or keyword(s). For example, although the category "Basketball" can be viewed as a smaller subset of the information related to the category "Sports", the subset category "Basketball" is, nevertheless, a relatively large field of search. The subset may include information related to "NCAA Basketball", "NBA Basketball", "CIAA Basketball", and so forth.

Similarly, although the keyword, "NFL Football" can be considered a subset of the broader keyword "football", the subset includes information related to NFL teams, NFL players, NFL history, NFL rules, and so forth. As a result of the vastness of the information included within a subset, a searcher can experience difficulty in becoming an "expert" in searching information related to a particular keyword, category, topic, etc. In addition, the nature of a group of searchers (e.g., Peyton Manning fans) might influence the result(s) which they obtain. An information seeker might request results produced by searcher(s) associated with such an affinity.

There is also the issue of a user (also referred to as an Infoseeker™) being connected with a searcher (also referred to as a guide) who is of a different demographic and/or world view. For example, a college-age female Infoseeker™ looking for information related to "Pink Floyd" might be connected to a 50-something male Infoseeker™ who has a significantly different worldview. Even though the information returned may be technically correct, the social aspect of a human-assisted search may not be fully leveraged. For this reason, it may be desirable to allow an information seeker to access searchers and/or search results which have been provided by a group of searchers that share a set of common characteristics. It may further be desirable to the affiliate group members to seek searches due to the nature of the characteristics which they share. For example a group of medical professionals who believe in 'the right to choose' may receive searches relating to women's health issues which would otherwise be sent to a general search.

In addition to the above-identified problem, although searchers may be assigned to particular keywords and categories, the searchers may not have a genuine interest in the topic for which they are registered to perform searches. A searcher may select a topic area due to a high frequency of queries by information seekers relating to that topic, due to increased earning opportunities. As a result, the searchers may not be as effective as they could be were they genuinely interested in the topic. In order to improve the relevant skills and share information regarding search resources and/or methods for obtaining information on a specialized area of interest it may be useful to build cooperative and/or competitive communities of searchers. Such affiliate groups could work as teams to produce a result for a search query and share in the compensation.

Further, in some instances, information seekers have a need and/or desire to obtain search results pertaining to sensitive information that may not be available in standard databases and systems to which the public has access. For example, an information seeker desiring to search information regarding an endangered species may require services of a searcher who has access and authorization to search restricted and/or proprietary information databases and systems to retrieve such information. Heretofore, information search systems did not employ human searchers having the required specialized knowledge, access to, and authorization to search such information.

Some existing information search networks may already exist, such as travel agents, librarians, medical professionals (e.g., phone a nurse), and others. Such organizations may have competencies and/or access to resources unavailable to the general public, but it is difficult for a conventional search system employing automated search techniques to provide access to and indexing of resources provided by such an affiliate network.

For these many reasons a method for enabling affiliate group searching using human searchers in which access control may be exercised for information seekers and/or human searchers seeking access to such search services would be greatly appreciated.

SUMMARY

In light of the foregoing, what is needed is an information search method and system employing human searchers (sometimes referred to as guides or producers or providers or workers) who belong to affiliate groups.

The embodiments disclosed herein allow an information seeker to utilize affiliate group searching involving human searchers who are members of particular information affiliate groups. Each affiliate group may have an area of expertise in which they are particularly skilled, or each affiliate group may have a shared set of characteristics such as age, gender, sexual preference, geographic locale, language, political persuasion, career, club, educational background, hobby, or other characteristic that bonds the affiliate group together, even if only loosely.

An affiliate group might involve simply membership in or having a loose affiliation with websites, such as MySpace® or Facebook®. In at least one embodiment, a method for providing affiliate group searching includes accepting designation of an affiliate group for providing information searching and presenting search results produced by a member of the affiliate group to an information seeker (sometimes referred to as a user or requester or Infoseeker™).

A searcher might opt in or opt out of an affiliate group in much the same way that people elect to join a club, professional organization or social group. Searchers may also be organized into affiliate groups based on information provided to the search system during or after registration which would indicate particular affiliations.

Affiliate groups may be created and dissolved readily. The search system may allow groupings to be created by associating a group of searchers with one or more keyword(s) which may be selected by the affiliate group, or the system administrators to designate an affiliate group. The affiliate group may then select keywords and/or categories with which the group desires to be associated. Members of affiliate groups may further be ranked within the group in order to establish a preference for a particular member who has relevant skill to reply to a search query. Likewise, affiliate groups may be ranked by their ability to produce relevant results for a keyword, category, etc. In this way, an information seeker may locate an affiliate group most likely to produce a relevant result for a query.

It is an aspect of the invention that an affiliate group may designate items which are exclusively accessible to members of the affiliate group. The items may include training materials, resources, software applications, search result(s) and other items which may assist a searcher in performing a search.

It is an aspect of the invention that an existing network of affiliate members, who may be employees of a company, members of a web-based information search network may be registered as guides within the search system. Information from the current network may be used to create a group and/or guide profile. This may enable the affiliate network to more effectively market and/or utilize resources of the network without compromising security of the data employed in their operations.

BRIEF DESCRIPTION OF THE DRAWINGS

Aspects and advantages of the embodiments will become apparent and more readily appreciated from the following description of the embodiments, taken in conjunction with the accompanying drawings, of which:

FIG. 3 is an illustration of an affiliate group database;

FIG. 4 is an illustration of an affiliate group searcher database;

FIGS. 5 and 5A illustrate an authorization database;

FIGS. 8 and 8A illustrate a searcher registration web page;

FIG. 10 is an illustration of a search page accessible via the search window presented in the affiliate group web page of FIG. 9;

DETAILED DESCRIPTION OF THE PREFERRED EMBODIMENTS

Figure 1:
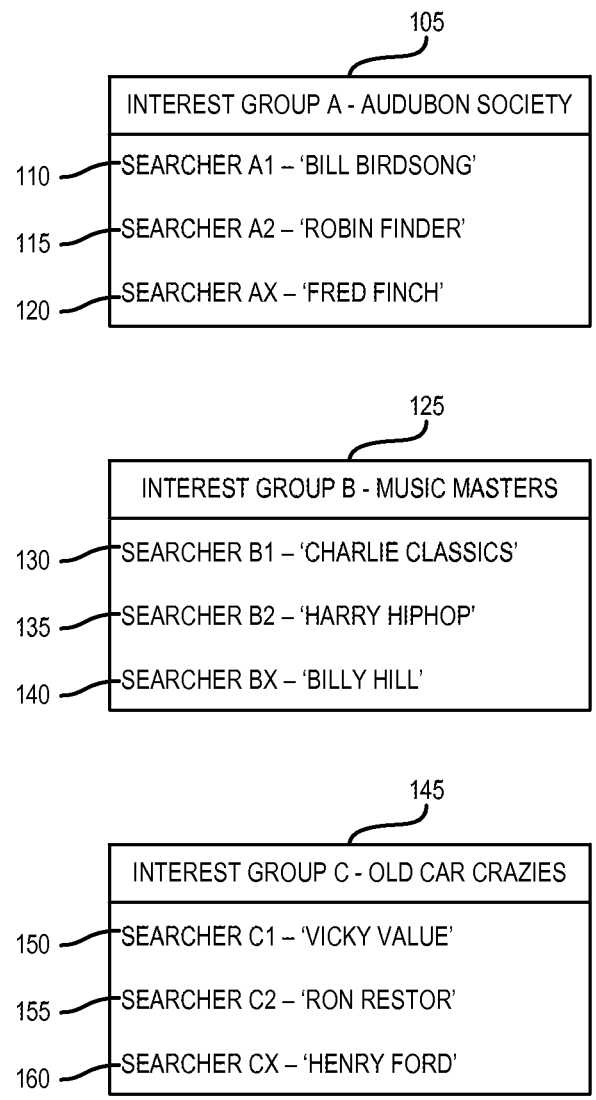
FIG. 1 is a diagram illustrating the relationship between affiliate groups and affiliate group searchers.

Reference will now be made in detail to the embodiments, examples of which are illustrated in the accompanying drawings, wherein like reference numerals refer to like elements throughout.

As discussed herein, information seekers can select a specific affiliate group to conduct information searching and provide search results in response to a search query(ies) from an information seeker(s). As an affiliate group(s) might specialize in a particular field or category of information, such a group(s) can be very effective in fielding search queries for particularly "difficult-to-find" information. In other cases, affiliate groups may allow for the human searchers to be more connected to information seekers because of their age, gender, sexual preference, geographic locale, language, political persuasion, career, club, educational background, hobby, characteristic or affiliation that bonds them, even if the bond is only a loose one. Examples of affiliations might be schools, colleges, charitable organizations, consumer-facing businesses such as Delta® Air Lines or any other airlines, information service businesses, defense contracting businesses, government groups, clubs, social groups, online social networks such as MySpace® or Facebook®, etc. In yet other cases, the members of an affiliate group may have a highly specific membership such as being employed by a company(ies), membership in an organization(s) (e.g., Society for Information Display, NRA, U.S. Army), or have special access privileges for a resource such as for example a restricted database (e.g., health care related information, unpublished research, company confidential information), thus such affiliate groups may be referred to as a restricted access affiliate group.

In the embodiments described herein, designation of an interest group for providing information searching is described, and method for receiving a search result(s) produced by a member of an affiliate group is disclosed.

As illustrated in FIG. 1, according to at least one embodiment, human information searchers responding to search queries from information seekers are divided into affiliate groups (the terms affiliate group and interest group are used herein interchangeably). An affiliate group includes one or more information searchers having "expertise" in a particular field(s) of information searching in which the group specializes. "Expertise" as used in the previous sentence and as used hereinafter, unless otherwise indicated, may, but does not necessarily, imply an elevated level of knowledge and/or education regarding a subject. "Expertise" as utilized herein may also include having a familiarity with information resource(s) on a topic, access to resource(s) on a topic which are not generally available, a particularly high interest in a topic, demonstrated capability (e.g., from competency testing, or ratings by others familiar with a topic) or even a confidence level in one's own ability to provide timely and/or accurate responses to queries in an area regardless of prior knowledge of the area. An "affiliate group" as the term is utilized herein, unless otherwise specified, may include any group having members who have a common interest in a subject matter, employees of a business entity, persons who live in or regularly visit a specific geographic location, current and former students and/or faculty members of an educational institution(s), persons who share a common social bond, persons with common aspects to their demographic profiles and/or other groups formed around a common interest in a subject matter. Thus an affiliate group may be all or any of the members of a non-profit or other charitable organization, all or any of the employees of a corporation, a web-based social or interest group or some other group or organization sharing a common interest or common bond.

In at least one embodiment, an affiliate group may be based upon a social connection. For example, if an affiliate group is comprised of MySpace® members, then there may be a common bond among information seekers and the searchers who are finding results for those information seekers. Having a common worldview can be important when providing and accessing human-assisted search results and services.

In at least one embodiment, information seekers may be provided with a connection to a group such as flight attendants who by the nature of the job know something about travel. Members of an affiliate group may have a focus of expertise within the subject matter associated with the group. For example, some flight attendants may sign-up to answer queries about Japan and/or Tokyo, some others might sign up for keywords such as Rio and/or Brazil, depending upon travel experience and schedule.

For example, affiliate group A 105 (FIG. 1) (e.g., "Audubon Society") includes information searcher A1 110 (e.g., "Bill Birdsong"), information searcher A2 115 (e.g., "Robin Finder"), and information searcher AX 120 (e.g., "Fred Finch"). The affiliate group A 105 may specialize in the field or category bird watching, for example, members of the National Audubon Society. Members of the group could be particularly helpful in assisting an information seeker who happened to be looking out of his or her window and noticed a strangely colored bird or heard an unusual bird call. Not knowing the name of the bird or other identifying information, responding to a request to identify the bird may be difficult for a generalist information searcher, that is, a searcher who is not a member an affiliate group (e.g., affiliate group A 105). A searcher who is a member of the interest group with expertise in bird watching (e.g., "Audubon Society") might easily provide search results identifying the bird due to a searcher's familiarity with bird identification resources or personal knowledge of birds. A searcher who is a member of such an affiliate group would likely have knowledge of and access to resources which are helpful for identifying birds. As a result, the affiliate group searcher might be able to assist the information seeker with identifying the bird in a timely and accurate manner. As explained further hereinafter, the likelihood of providing relevant search result(s) may be increased by limiting the selection of searchers from the affiliate group to searchers who are from a locality or region. Such searchers might have relevant local knowledge (e.g., knowledge of birds native to or commonly found in an area designated by a user).

In at least one embodiment, each of the searchers within an affiliate group may have a special area of interest within the affiliate group area of interest. For example, the affiliate group B 125 (e.g., "Music Masters") may represent a group of searchers with expertise in music. Searcher B1 130 (e.g., "Charlie Classics") may specialize in the category or keyword of "classical music". The searcher B2 135 (e.g., "Harry Hiphop") may have interest in a category or keyword such as "hip-hop music", while the searcher BX 140 (e.g., "Billy Hill") may specialize in "country music".

Similarly, affiliate group C 145 (e.g., "Old Car Crazies") may be an affiliate group having a specialization in antique automobiles. Any of the searchers, that is searcher C1 150 (e.g., "Vicky Value"), searcher C2 155 (e.g., "Ron Reston"), and searcher CX 160 (e.g., "Henry Ford") possibly having different specializations within the group interest, such as antique automobile valuation, restoration and history of the automobile industry as a whole, or a specific manufacturer or model.

In the restricted membership affiliate group embodiment, an affiliate group may be composed of members of a specific company or organization who are sharing confidential information. For example, members of such a restricted membership affiliate group may be a legal expert, an accounting expert, and an engineering expert, all of whom have a common bond, such as, being employed by a specific corporation.

In at least one embodiment, an information seeker can select a searcher from a selected affiliate group. For example, an information seeker can specifically request the searcher B2 135 ("Harry Hiphop") from the affiliate group B 125 ("Music Masters"). For instance, an information seeker desiring to identify a song title for a hip-hop music song may select searcher B2 135 ("Harry Hiphop") and/or search result(s) produced by him or her. An information seeker may also select a searcher due to the selected searcher having satisfactorily provided the information seeker with a search result(s) for a previous query.

In at least one embodiment, an information seeker is presented with a GUI (such as that illustrated in FIG. 13) providing access to a profile of searchers within an affiliate group. A profile may provide information regarding a searcher(s) to facilitate selection of a searcher who might be particularly well suited for providing a search result(s) for an information seeker query. Among the attributes of a searcher which may be identified in a searcher profile are a rating of the searcher, educational background of the searcher, a residence city and/or geographical region of residence of the searcher, a job title of the searcher, an availability indicator of the searcher, a list of prior queries answered by the searcher, search results for prior queries produced by the searcher, etc.

Alternatively, the system may automatically select a guide from an affiliate group based on availability of the searcher, difficulty of a query, a searcher skill level, specialization of a searcher, training record(s) of a searcher, etc. Such automatic selection of a searcher may be accomplished in accordance with the disclosure of U.S. applications, Ser. No. 11/780,297 entitled, "Method, System, and Computer Readable Storage for Podcasting and Video Training in an Information Search System", by Jones, et al., filed Jul. 19, 2007, Ser. No. 11/780, 241 entitled, "Method, Apparatus, and Computer Readable Storage for Training Human Searchers", by Jones, et al, filed on Jul. 19, 2007 and Ser. No. 11/780,329 entitled, "Method, System, and Computer Readable Medium Useful in Managing a Computer-Based System for Servicing User Intiated Tasks", by Jones et al., filed on Jul. 19, 2007 which disclosures are incorporated herein by reference and in application Ser. No. 11/336,928 previously mentioned. In utilizing the method of automatically selecting a searcher, a list of eligible searchers may be limited to searchers from an affiliate group.

Figure 2:
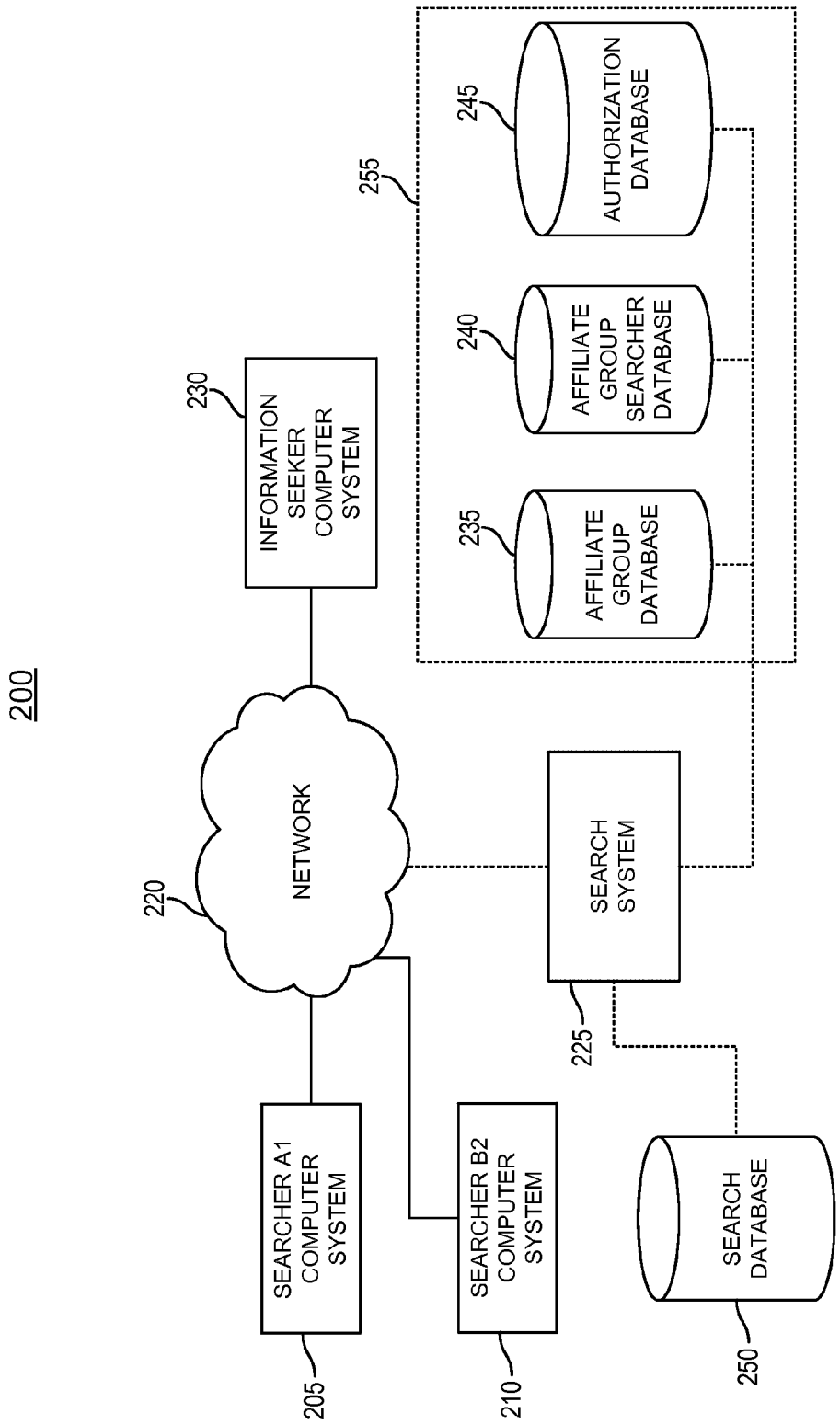
FIG. 2 is a system diagram.

As illustrated in FIG. 2, in at least one embodiment, system 200 is provided. System 200 includes the searcher computer system 205 the searcher computer system 210 a network 220 such as the Internet, a search system 225, an information seeker computer system 230, affiliate group database 235, affiliate group searcher database 240, an authorization database 245 and a search database 250.

Each of the searcher computer systems, that is, the searcher computer systems 205, 210 can be operated by members of an affiliate group(s). For example, the searcher computer system 205 may be operated by the searcher "Bill Birdsong", a member of the affiliate group "Audubon Society" (FIG. 1). The searcher computer system 210 may be operated by "Harry Hiphop", a member of the affiliate group "Music Masters". While only a limited number of searcher and information seeker (also referred to as a user or Infoseeker™) computer systems are depicted in FIG. 2, it is within the scope of the disclosure for multiple searcher and information seeker computer systems to be utilized.

The network 220 (FIG. 2) may be a global public network of networks (the Internet) or consist in whole or in part of one or more private networks and communicatively couples the searcher computer systems and user computer systems with the other components of the system such as the search system 225, the affiliate group database 235, the affiliate group searcher database 240, the authorization database 245, and the search database 250.

The search system 225 allows interaction to occur between the searcher computer systems 205, 210 and the information seeker computer system 230. For example, an information search query(ies) can be transmitted from the information seeker computer system 230 to the search system 225, where a query(ies) can be accessed by the searcher computer systems 205, 210. Similarly, a search result(s) produced using the searcher computer systems 205, 210 in response to a search query(ies) produced by the information seeker computer system 230 are transmitted to the search system 225, where they may be stored by the search system 225 and may be transmitted to the information seeker computer system 230.

The information seeker computer system 230 may include within the scope of the disclosure, any device through which an information seeker can submit a query to and receive a result(s) from the search system 225. In one embodiment, the information seeker computer system 230 may be a device configured for connection to a network and may run web browser software. Thus, the information seeker computer system 230 may be a laptop, personal data assistant, desktop PC or Mac®, a workstation or terminal connected to a mainframe, or a smart phone, etc. within the scope of the disclosure. Additionally, as disclosed in U.S. application Ser. No. 11/647,437 entitled, "Targeted Mobile Device Advertisements", by Jones, et al., filed on Dec. 29, 2006 and incorporated by reference herein, the search system may include a gateway for voice communication and a speech-to-text system or other transcription device or personnel to facilitate access to the search system via voice communications such as through a land line phone, cell phone, voice over internet protocol or other telephonic device. Such devices are also information seeker computer system 230 within the scope of the disclosure.

The search system 225 (FIG. 2) is communicatively coupled with the affiliate group database 235, the affiliate group searcher database 240, the authorization database 245 and the search database 250. As will be described herein in further detail below, the databases include data that is processed during operation of the embodiments.

After being presented with the disclosure herein, one of ordinary skill in the art will readily appreciate that the computer systems of the embodiments can be any type of viable computer systems known in the art.

In the disclosed system and method the guides or searchers may be required to register with the search system 225, and in certain embodiments undergo training prior to being permitted to provide responses to queries submitted by an information seeker(s) or user(s) utilizing the search system. In one embodiment, a prospective guide or searcher must be invited to register as a searcher with the search system. In such a system, a previously registered searcher or an affiliate group may initiate the invitation process and thereby be designated as a sponsor for the invited searcher. In one embodiment of the disclosed system and method, a prospective guide is sent an e-mail invitation to register as a guide or searcher with the search system. The e-mail invitation in one embodiment contains a link to a guide registration page and some indicia recognizable by the search system as to the person or entity that invited a prospective guide to register so that upon registration the person or entity may be accredited with sponsorship of the invited guide.

Should a prospective guide elect to register as a guide with the system, the prospective guide may for example initiate a registration process by clicking on a link that directs the guide's web browser to a URL of a guide registration page generated by a web server function of the search system 225. The search system may generate a registration web page designed and configured to allow a prospective provider to enter information for registration as a guide with the search system, as will be described herein below.

As illustrated in FIG. 3, a sample of an interest group record, of which one or more may be associated with or resident in the affiliate group database 235 (FIG. 2), may include affiliate group identification (ID) field 305, affiliate group rating field 310, search specialty field 315, assigned searcher(s) field 320, a related keyword(s)/category(ies) field 325, affiliate group search result(s) field 330, and affiliate group query(ies) field 335.

The affiliate group identification field 305 preferably includes a unique identifier of an affiliate group. For example, in at least one embodiment, the affiliate group identification field 305 can include a randomly generated numerical code, (e.g., "N1122") and/or a text string indicating the name of the particular affiliate group (e.g., "Audubon Society") as in FIG. 3. After being presented with the disclosure herein, one of ordinary skill in the relevant art will realize that other identifiers may be utilized without departing from the spirit and scope of the embodiments.

The affiliate group rating field 310 (FIG. 3) can include a rating or grade for a particular affiliate group. In at least one embodiment, the affiliate group rating field 310 is a grade reflecting the average grade of the group's individual searchers as provided by information seekers who have submitted search queries to the group. For example, if an affiliate group member (e.g., "Harry Hiphop' of "Music Masters") provides a search result(s), an information seeker may have rated the search result(s) a "5 out of 5" to indicate that "Harry Hiphop" (e.g., searcher B2 135 (FIG. 1)) performed well in providing the search result. If a second member of the affiliate group (e.g., "Billy Hill" of "Music Masters") provides a second search result(s) to an information seeker, an information seeker may rate the search result(s) provided by the second group member (e.g., searcher BX 140, "Billy Hill") or a second result(s) provided by the first group member (i.e., "Harry Hiphop") with a "3 out of 5" to indicate that the second search result(s) was mediocre. In such an instance, the affiliate group rating, having been determined by the average of the ratings of the individual members of the group, would be a "4", a reflection of the average user performance rating for search result(s) produced by the affiliate group. The affiliate group rating may be displayed in any manner including, but not limited to a "star" system wherein whole and partial stars are utilized to indicate the ranking, a numerical system wherein a numerical value is associated with the rating and/or other methods of depicting a value.

The affiliate group rating field 310 may include an overall rating of an affiliate group and/or a rating of the group associated with a category(ies) and/or keyword(s), etc. associated with the affiliate group. This feature may allow a skill and/or competence rating of an affiliate group to be independently maintained for a category(ies), keyword(s), or other information which is associated with the affiliate group. In this way, skill ratings for an affiliate group may be based upon a highly specialized area of interest (e.g., a keyword/query such as "1945 New York Yankees baseball trivia"), a more general area (e.g., "New York Yankees trivia"), a broader area of interest (e.g., "baseball trivia"), etc.

Using the example illustrated in FIG. 3, the overall rating of "Audubon Society" is 'A1', its rating on the category "Nature" is 'B2', and its rating on the keyword "Robin" is '19'. Using the same example, the search result 'birds of Indiana', which may be associated with the query/keyword "what bird has a red head and no tail" has a rating '5' and the result 'Audubon Club of California', which may be associated with the query/keyword "where can I learn about birding in California" has a rating '10'.

In at least one embodiment, elements in the affiliate group database 235 may be linked for example by a pointer. For example items in the affiliate group rating field 310 may be associated with items in the related keyword(s)/category(ies) field 325 (e.g., Overall—A1, "Nature"—B2). Likewise, information in the affiliate group search result(s) field 330, interest group query(ies) field 335 and the affiliate group rating field 310 may be associated. For example, the result 'Audubon Club of California' when associated with the query 'where can I learn about birding in California' may have a rating of '10'.

After being presented with the disclosure herein, one of ordinary skill in the relevant art will realize that other rating schemes and methods may be utilized without departing from the scope and spirit of the embodiments. Ratings may be based upon results of voting, review by authorized members, etc. In at least one embodiment, a rating is based on the association of a query and/or keyword with a result(s). The relevance of a result to the keyword or query may be reviewed by a weighted voting process as described in the related Provisional Application U.S. Ser. No. 60/913,944, entitled, "Knowledge Vetting System and Method for Search Results", by Scott A. Jones, filed Apr. 25, 2007 which disclosure is incorporated herein by reference.

In at least one embodiment, an interest group record associated with or resident in the affiliate group database 235 includes the search specialty field 315 to allow an information seeker to obtain information regarding a specialization or expertise of an affiliate search group. For example, if a group (e.g., "Audubon Society") specializes in bird watching, the search specialty field 315 could provide details regarding the interests of the group (e.g., "birds and birding"). As another example if a group (e.g., affiliate group C 145 (FIG. 1) 'Old Car Crazies') specializes in antique cars, the definition of "antique automobiles", for example, whether the "more than 25 years old" definition of the Antique Automobile Club of America or "older than classic cars built between 1925 and 1948" of the Classic Car Club of America is used by the group might be indicated in the search specialty field 315 of the interest group record associated with the affiliate group (e.g., affiliate group C 145).

In at least one embodiment, example search queries are provided which may allow an information seeker to determine whether he or she would like to utilize a particular affiliate group. Such information might be included in the affiliate group query(ies) field 335. For example, "what bird has a red head and no tail" or "where can I learn about birding in California" might be included in this field for the interest group "Audubon Society" as illustrated in FIG. 3.

In at least one embodiment, any or all previous search result(s) based on information included in the affiliate group search result(s) field 330 may be presented to an information seeker to aid in his or her decision regarding use of an affiliate group searcher. For example, results such as 'birds of Indiana', 'Audubon Club of California', etc. which may provide resources and/or a specific answer to an information seeker may be included in this field as illustrated.

To facilitate presentation of queries and search result(s) to an information seeker, a search database 250 (FIG. 2) of previous queries and previous search results, resource(s), etc. may be maintained as described in greater detail in Provisional Application Ser. No. 60/821,595 entitled, "Electronic Previous Search Results Log", by Scott A. Jones, filed on Aug. 7, 2006 which disclosure is herein incorporated by reference. The data structure utilized for a previous query(ies) may include a field indicative of an affiliate group(s), if any, to which a query was assigned. Similarly, a data structure utilized for storage of search results may include a field or flag indicative of an affiliate group(s), if any, with which a searcher providing a search result(s) is associated.

Additionally, a previous query(ies) as contained for example in the affiliate group query(ies) field 335 and/or search results contained for example in the affiliate group search result(s) field 330 generated for a query(ies) by searchers associated with an affiliate group may be utilized to present information to an affiliate group member(s) of a query(ies) assigned and/or accepted and a search result(s) associated with a query(ies). Such information may be utilized by an affiliate group member(s) to better understand an interest area of the affiliate group and of an information seeker(s) generally with regard to a subject matter in which the affiliate group has an interest. Such information may be utilized to determine topics which might be addressed in an internal or external communication such as a blog, web page, printed media, e-mail communication, etc., to more directly target advertising presented on an affiliate group web page, for purposes that might increase profitability, popularity and/or membership level of an affiliate group, to identify training resources for a group member(s) to improve search skills, etc.

The assigned searcher(s) field 320 identifies a searcher(s) who is a member of an affiliate group. For example, in at least one embodiment, the assigned searcher(s) field 320 for the affiliate group A 105 (FIG. 1) "Audubon Society" includes names and/or identifiers of searcher A1 110 (e.g., "Bill Birdsong" (1143)), searcher A2 115 (e.g., "Robin Finder" (2167)), and searcher AX 120 (e.g., "Fred Finch" (4433)). The assigned searcher(s) field 320 (FIG. 3) may allow an information seeker to select an individual searcher(s) from an affiliate group to provide a search result(s). The selection may be made anonymously (i.e., without requiring an exchange of identifying information of a searcher(s) and/or information seeker(s)).

The related keyword(s)/category(ies) field 325 may include keywords and/or categories to which an affiliate group interest is related. Continuing with the example in FIG. 3 of the affiliate group pertaining to "birds and birding", the related keyword(s)/category(ies) field 325 for such a group could include the keywords, "robin", "finch", and "bird songs" and the category "Nature". The contents may allow the system to select an affiliate group(s) by analyzing a query entered by an information seeker using keywords/categories related to an affiliate group.

Figure 13:
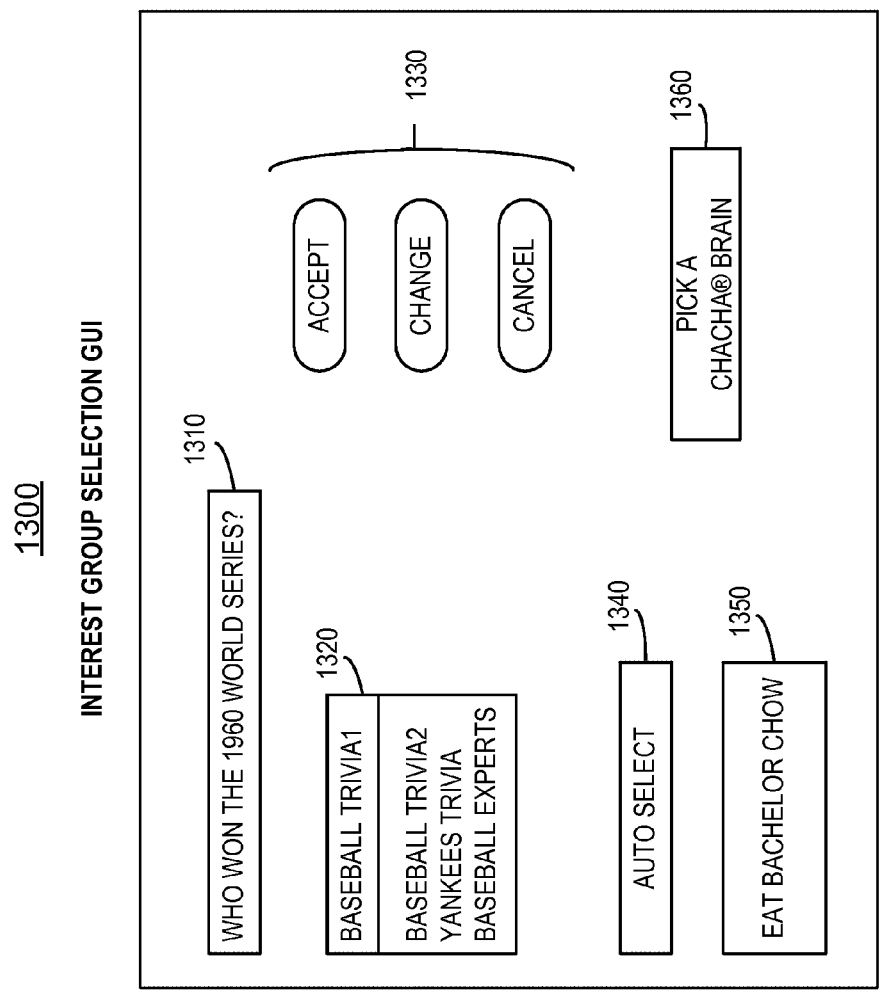
FIG. 13 is an illustration of an alternate GUI for affiliate search group selection.
Figure 14:
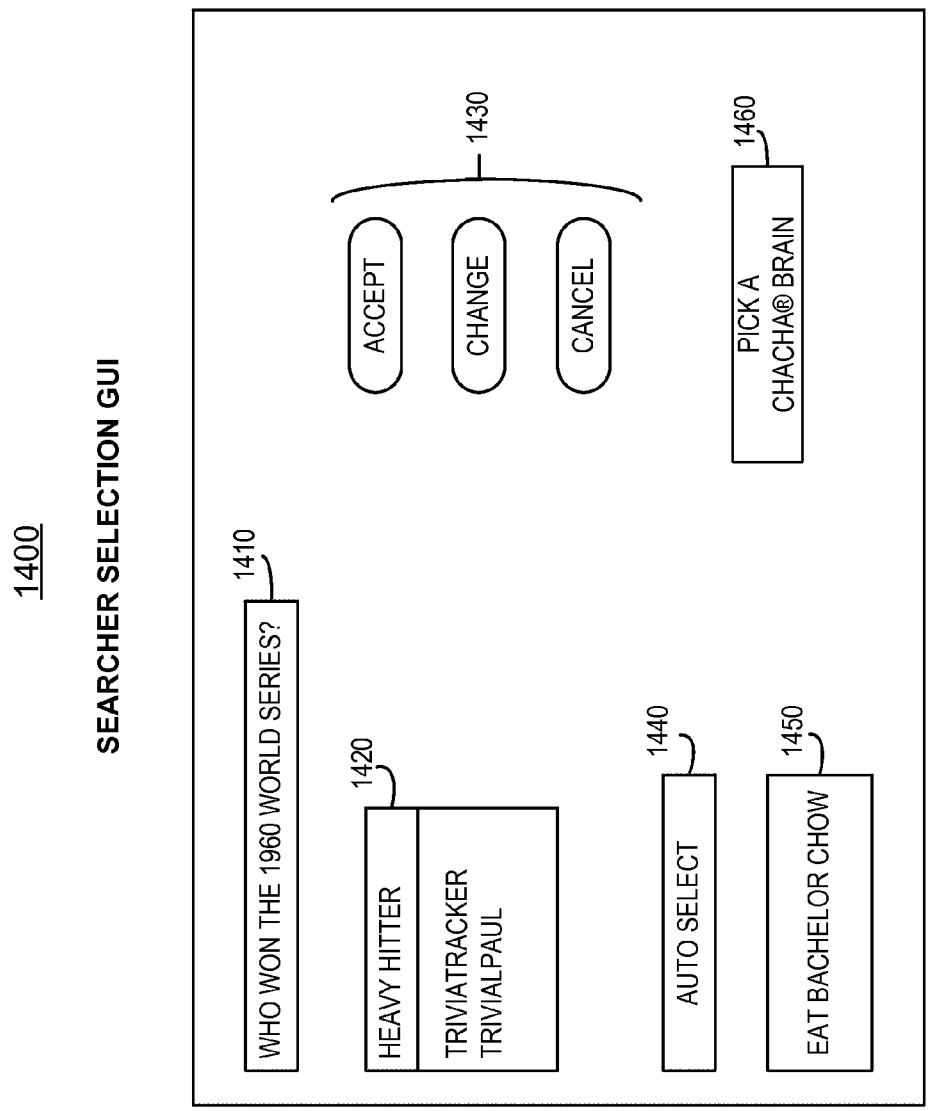
FIG. 14 is an illustration of a searcher selection GUI.

In at least one embodiment, if an affiliate group has selected to include a search window driven by the disclosed system on an affiliate group web page, all queries presented through the search window may be directed if possible to registered searchers who are members of the affiliate group. In an alternate embodiment, if an information seeker utilizes a search engine on a web page of the search system, a query is analyzed to determine a keyword(s) and/or category(ies) to which a query most likely relates. If a recognized affiliate group with members who have registered as searchers exists that has a particular interest in a subject matter to which a query relates, the search system 225 (FIG. 2) may generate a pop-up window or other notification in an information seeker interface. If such interface is, for example, running a web browser, a GUI may allow the information seeker to choose to utilize the services of a searcher who is a member of an affiliate group. To determine whether to present such a notification, the search system 225 (FIG. 2) may compare a query, a keyword(s) and/or category(ies) from a search query and contents of the related keyword(s)/category(ies) field 325 (FIG. 3) of an interest group record associated with or resident in the affiliate group database 235 (FIG. 2) to determine affiliate groups which might have an interest in a subject matter related to an information seeker query. Exemplary graphical user interfaces for selecting an affiliate group and/or group member when prompted by the search system 225 are illustrated in FIGS. 13 and 14.

In at least one embodiment, an affiliate group may structure a compensation agreement to indicate willingness to receive different compensation for a search query(ies) directed to its members from a web page of the search system provider associated with a keyword(s) and/or category(ies). For example, a travel affiliate group might share revenues derived from information seekers directed to the affiliate group members by the search system 225 (FIG. 1).

As illustrated in FIG. 4, a sample record of an interest group searcher of which one or more may be associated with or resident in the affiliate group searcher database 240 (FIG. 2) includes information related to an individual searcher(s) of an affiliate group(s) such as searcher identification (ID) field 405, affiliate group ID field 410, searcher username field 415, searcher verification code 420, searcher rating field 425, competence area within interest group field 435, demographic profile data field 440, and geographic location data field 450.

The searcher identification field 405 preferably includes a unique identifier of an affiliate group member. For example, in at least one embodiment, the searcher identification field 405 can include a randomly generated numerical code such as "4433". The searcher identification field 405 can include a text string indicating a name of a particular affiliate group member, for example, "Fred Finch" as illustrated in FIG. 4.

The affiliate group ID field 410 includes an identifier of an affiliate group(s) associated with a searcher, which may include a numeric identifier which is preferably unique and preferably consistently used, and/or a text string indicating the name of the affiliate group (e.g., "Audubon Society (N1122)", "Indiana Rifle Club (N1492)"). As any or all the affiliate groups associated with a searcher are included in the affiliate group ID field, an information seeker is able to select to use the searcher to search for information as a member of another affiliate group, or for other queries.

The searcher username field 415 may include a text string and/or numerical code used to allow a searcher to search a resource(s) to produce a search result(s) in response to a search query(ies). As will be described herein in further detail below, a human searcher seeking to produce a search result(s) in response to an information search query(ies) may be prompted to enter his or her username as part of a verification process. As illustrated in FIG. 4, a different username may be used for each affiliate group (e.g., "Fred Finch" as a member of "Audubon Society", "Firearm Fred" as a member of "Indiana Rifle Club") which may allow usage of existing login data from a database and/or resource, for example.

Searcher verification code field 420 includes a verification code for verifying that an affiliate group member is a member of an affiliate group. A searcher verification code may be a text string and/or numerical code that operates in conjunction with contents of the searcher username field 415 to verify a searcher authorization(s). In at least one embodiment, a username entered by a searcher is used to retrieve or "look-up" the searcher's verification code (password) to compare the verification code with a verification code entered by a searcher. If both a username match occurs and a verification code match occurs, a searcher may be allowed to search an information resource(s) and provide a search result(s) in response to a search query, as will be described in further detail herein below. Other types of security data, such as fingerprint, retinal scan data, etc. may be indicated in the verification code field when methods such as biometrics are used for access verification without departing from the scope of this disclosure.

Searcher rating field 425 includes a rating for an affiliate group searcher. In at least one embodiment, the rating is a numerical indication, for example, "5". A rating can be determined by for example, averaging performance ratings for a searcher for queries directed to the affiliate group or any other method as described in the related U.S. applications, Ser. No. 11/780,297, Ser. No. 11/780,241, and Ser. No. 11/780,329 previously mentioned. For example, if a searcher received a performance rating of "4.5" for providing a first search result, a "2.5" for providing a second search result, and a "3.5" for providing a third search result, the searcher rating field 425 might specify a rating of "3.5". A searcher rating may be calculated from data produced by methods such as user ratings, review by members of an affiliate group, review by general searchers, usage data, etc. as described in the related Provisional Application U.S. Ser. No. 60/913,944, previously mentioned.

The searcher rating field 425 in at least one embodiment, may include a ranking indicator. For instance, in a configuration in which there are several levels of expert searchers, for example, "level 1 expert", "level 2 expert", or "level 3 expert", a searcher who is ranked as the best "level 1 expert" searcher in the system (or an affiliate group) may be specified by including a value of "1-1" (first ranked level 1 searcher) in the searcher rating field 425. Similarly, a low-ranked "level 2 expert" may be specified by including a value of "2-45" (forty-fifth ranked level 2 searcher). Searcher ratings and or rating methods may be different for different interest groups, as illustrated in FIG. 4. For example, the searcher "Fred Finch (4433)" has a rating '2' associated with the interest group "Audubon Society (N1122)" and a rating 'Novice-4' for the interest group "Indiana Rifle Club (N1492)".

After being presented with the disclosure herein, one of ordinary skill in the relevant art will immediately recognize that other ranking and/or rating method(s) may be utilized without departing from the scope and spirit of the embodiments.

For example, a global ranking system may be employed by the embodiments. In such a scheme, as illustrated in FIG. 4 the searcher rating field 425 may include a numerical value indicating the overall ranking of a searcher associated with that record. For example, a value of "5" would indicate that a searcher is the (e.g., 'Fred Finch 4433') is the fifth best searcher out of all of the searchers in the affiliate group 'Audubon Society'.

Competence area within interest group field 435 may include information of a specific area of interest within an affiliate group's expertise, for example, a subcategory within an area of interest of the affiliate group. For instance, if an affiliate group searcher is a member of the "Audubon Society" affiliate group (i.e., the affiliate group A 105 (FIG. 1)), the competence area within interest group field 435 for an interest group searcher could specify "finches" and/or "bird photography" to indicate that a searcher's area of expertise or competence is in these subcategories.

The demographic profile data field 440 includes information regarding a searcher such as age or date of birth, educational background, sex, ethnicity, etc. that may be compared to information in a target profile(s), keyword(s), category(ies), etc. associated with a query indicating that the query may be answered by a searcher with a specific demographic profile. Information contained in the demographic profile data field 440 may be acquired from a searcher when he or she registers with the search system or updates his or her profile. Demographic information may be acquired by monitoring online activity(ies) of a searcher, by other observational data, using "cookies" from the searcher system, by importing data from other resources, by testing a guide, etc. Exemplary demographic data is illustrated in FIG. 4, however it will be apparent to one of ordinary skill in the relevant art that any sort of demographic data may be used.

The geographic location data field 450 includes data indicative of geographic locations with which a searcher may be familiar based on prior or current residence, work location, searcher selection, etc. Such data may be acquired as part of a registration process, when a searcher updates his or her profile, automatically by geo-targeting technology based on the IP address or network location through which a searcher is connected to the Internet or other network, via importing or accessing data in external computer systems, etc. For example, an affiliate group might comprise flight attendants for an airline, and the geographic location data field 445 may include frequent destinations for a flight attendant(s). Such information may be acquired directly from a flight attendant, from an airline database regarding flight assignments of an attendant(s), from published schedules of flights, etc. Contents of the geographic location data field 450 may be utilized to select a searcher(s) who may have familiarity with a locality to which a search query(ies) relates to perhaps improving the likelihood that a search result(s) will be responsive to a query.

As illustrated in FIG. 5, a sample of an interest group authorization record, of which one or more may be associated with or resident in the authorization database 245 (FIG. 2), includes information associated with information seekers that may be allowed or authorized to submit information search queries to an affiliate group(s). For example, in a restricted environment where health related information is searched, not all information seekers may be allowed to submit a query to an affiliate group responsible for searching medical history resource(s). In at least one embodiment, in addition to not being Internet accessible and/or subject to other physical network security measures, an information seeker seeking to obtain a response to a query for example, relating to sensitive information, may be required to verify his or her identity. Such a measure may be performed in an attempt to minimize or prevent unauthorized access to a sensitive information resource(s).

Continuing with the example of the bird interest group presented above, a proprietary database of rare and/or endangered bird species might be created and made available only to certain members of the "Audubon Society" interest group (i.e., affiliate group A 105 (FIG. 1). The group might allow one or all affiliate members to access the database, but might only allow a specific list of authorized users to access and search the database in order to avoid use by amateurs and/or poachers that may be using the resource and thus affecting the survival of the species. An authorized user(s) might for example, be sent an encrypted e-mail with a user ID and login information.

As illustrated in FIG. 5, the exemplary interest group authorization record includes affiliate group identification (ID) field 505, authorized user(s) ID field 510, authorized user(s) username field 515, authorized user(s) password field 520, authorized searcher(s) ID field 525, authorized searcher(s) username field 530, and authorized searcher(s) password field 535.

The affiliate group ID field 505 contains an identifier of an affiliate group which may require authorization to submit a query to and/or search a resource(s) of the affiliate group. The identifier may be that used in the other records (see FIGS. 3 and 4), or may be an indicator thereof.

The authorized user(s) ID field 510 includes a unique identifier identifying an information seeker(s) allowed to submit queries to an affiliate group(s). For example, the authorized user(s) ID field 510 may include a random code and/or number and/or a text string identifying an information seeker, for example, the name of the information seeker.

The authorized user(s) username field 515 may include a text string or numerical code used to control access by an information seeker to submit an information search query(ies) to an affiliate group in the system. The contents of the authorized user(s) username field 515 can be utilized for login purposes in conjunction with information contained in the authorized user(s) ID field 510 to specifically identify a user.

As will be described herein in further detail below, an information seeker desiring to submit an information search query to an authorized user affiliate group may be prompted to enter his or her username as part of a verification process.

The authorized user(s) password field 520 may include information such as a text string and/or numerical code that operates in conjunction with the contents of the authorized user(s) username field 515 to verify a user access privilege(s). In at least one embodiment, a username entered by an information seeker may be used to retrieve or "look-up" the user's password stored in the authorized user(s) password field 520 to compare the password with a password entered by a user. If both a username match occurs and a password match occurs, a user may be allowed to submit an information search query(ies), as will be described in further detail herein below.

The authorized searcher(s) ID field 525 includes a unique identifier identifying a guide(s) allowed to respond to queries submitted to and/or to access resource(s) of an affiliate group(s). For example, the authorized searcher(s) ID field 525 may include a random code and/or number and/or a text string identifying an information seeker, for example, the name of the information seeker.

The authorized searcher(s) username field 530 may include a text string or numerical code used to control access by a human searcher (guide) to respond to information search query(ies) submitted to an affiliate group(s) in the system. The contents of the authorized searcher(s) username field 530 can be utilized for login purposes in conjunction with information contained in the authorized searcher(s) ID field 525 to specifically identify a searcher. As illustrated in FIG. 5A, the authorized searcher list for the restricted affiliate group (e.g., 'Audubon Society—Rare and Endangered' and the searcher list may not be identical to that of an unrestricted affiliate group. Likewise the list of authorized users may be similarly modified. In this way, an affiliate group may control access to specific resources and/or respondents to specific types of queries while allowing other more generalist searchers who may also be members of the affiliate group to access a different group of resource(s).

As will be described herein in further detail below, a searcher desiring to respond to a search query assigned to an authorized searcher affiliate group may be prompted to enter his or her username as part of a verification process.

The authorized searcher(s) password field 535 may include information such as a text string and/or numerical code that operates in conjunction with the contents of the authorized searcher(s) username field 530 to verify a searcher access privilege(s). In at least one embodiment, a username entered by a searcher may be used to retrieve or "look-up" the searcher's password stored in the authorized searcher(s) password field 535 to compare the password with a password entered by a searcher. If both a username match occurs and a password match occurs, a searcher may be allowed to provide an information search result(s) and/or search resource(s) of the affiliate group, as will be described in further detail herein below.

Figure 6:
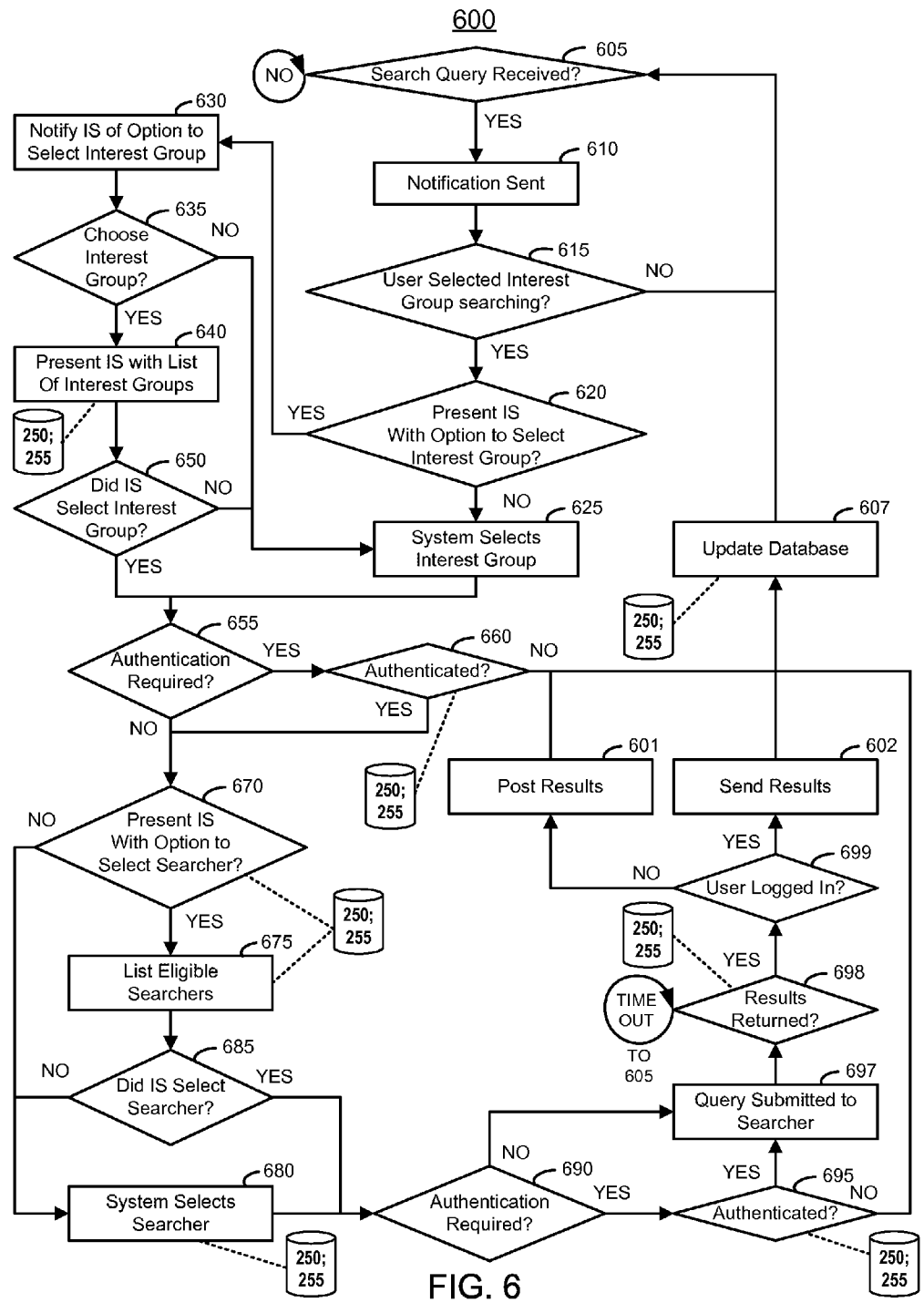
FIG. 6 is a flow diagram depicting a method of operation.

As illustrated in FIG. 6, a method 600 for information seeker selection of and obtaining access to affiliate group searching is provided.

In operation 605 a determination is made as to whether a search query is received. If it is determined that a search query has not been received, method 600 continues to wait. If it is determined that a search query has been received, control is passed to operation 610 and method 600 continues.

In operation 610, a notification is sent to the information seeker indicating that affiliate group searching is available, based on the content of a query. In at least one embodiment, for example, an electronic menu is provided. The electronic menu may include a link for presenting a graphical user interface for affiliate group searching. Control is passed to operation 615 and method 600 continues.

In operation 615 a determination is made as to whether a user has selected interest group searching. A determination may be made based on any suitable indication by a user. For example a link to an interest group website may be activated, a button in a graphical user interface (GUI) may be activated, a voice input may be made, etc. If in operation 615 it is determined that interest group searching is not selected, control is passed to operation 605 and method 600 continues. If in operation 615 it is determined that interest group searching is selected, control is passed to operation 620 and method 600 continues.

In operation 620 a determination is made whether an information seeker (IS) is to be presented with an option to select an interest group(s) for providing a search result(s). If it is determined in operation 620 that an information seeker is not to be presented with an option to select an interest group(s) control passes to operation 625 and method 600 continues. If it is determined in operation 620 that an information seeker is to be presented with an option to select an interest group(s) to provide a search result(s) control is passed to operation 630 and method 600 continues.

The determination in operation 620 may be based on the availability of multiple interest groups for a topic, a contractual agreement between a particular affiliate group and the system provider (e.g., the highest bidder for a query), current volume of queries on the topic, etc. The selection of determination criteria may be made manually by system administrators, or according to pre-established conditions. Such actions may allow for optimization of income for the provider of the system.

In operation 630 a notification is sent to an information seeker that an option to select an interest group(s) to provide a search result(s) for a search query is available. Control is passed to operation 635 and method 600 continues.

Figure 9:
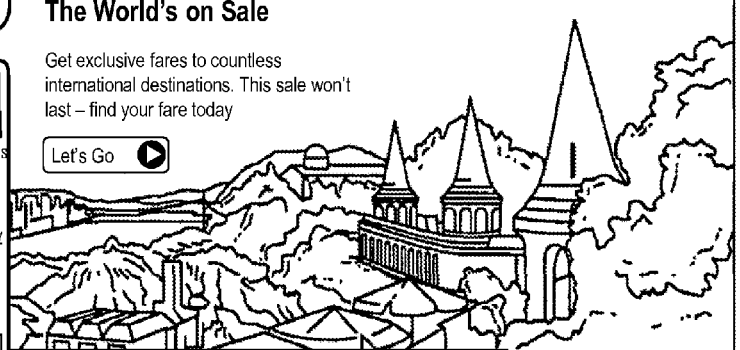
FIG. 9 is an illustration of an affiliate group web page including a search window driven by the search system.
Figure 12:
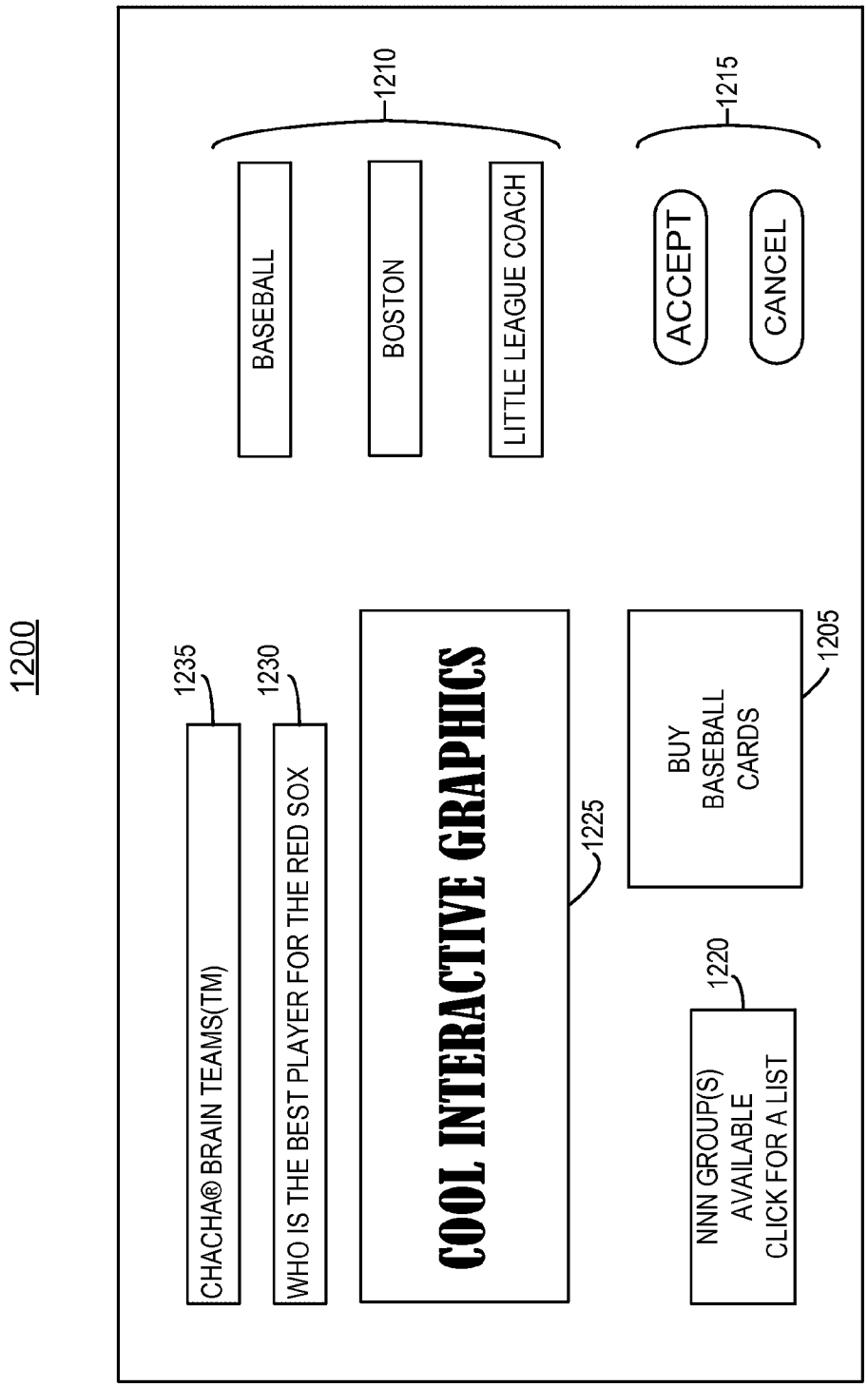
FIG. 12 is an illustration of a graphical user interface (GUI)

The notification in operation 630 may be a simple pop-up GUI as illustrated in FIG. 9 or a complex interactive GUI as illustrated in FIG. 12. The notification may be presented via any suitable medium, such as an instant message (IM), wireless, voiceXML, e-mail, etc.

In operation 635 a determination is made whether an information seeker chooses to select an interest group to provide a search result(s) for a query. If it is determined in operation 635 that an information seeker chooses to select an interest group to provide a search result(s), control is passed to operation 640 and method 600 continues. If it is determined in operation 635 that an information seeker does not choose to select an interest group to provide a search result(s) for a query, control is passed to operation 625 and method 600 continues.

In operation 640 a list of interest group(s) is presented to an information seeker. The list of interest groups may be displayed in any order. In a preferred embodiment, the list of interest group(s) may be presented in order of relevance and/or competence to perform a search based upon a method determined by the search system 225 (FIG. 2). The list of interest groups may be limited to a predetermined number to avoid information overload for an information seeker. The list may be presented in a GUI such as that illustrated in FIG. 13. Control is passed to operation 650 and method 600 continues.

In operation 650 a determination is made whether an interest group(s) is selected by an information seeker. If it is determined in operation 650 that an information seeker has selected an interest group(s) to provide a search result(s) for a query, control is passed to operation 655 and method 600 continues. If it is determined in operation 650 that an information seeker has not selected an interest group to perform a search control is passed to operation 625 and method 600 continues. The determination that an Infoseeker™ has not selected an interest group may be made actively (e.g., the user clicked on the "auto select" button 1340 (FIG. 13)) or passively (e.g., the user times-out).

In operation 655 a determination is made whether a user login, password, and/or other authentication are required to submit a search query to a selected interest group(s). If in operation 655 it is determined that a user authentication is not required, control is passed to operation 680 and method 600 continues. If in operation 655 it is determined that a user authentication is required to submit an information search query to an interest group(s) a notification is sent to an information seeker and control is passed to operation 660 and method 600 continues.

In operation 660 a determination is made whether an information seeker has entered a valid set of login credentials. If in operation 660 it is determined that a valid login credential(s) has been entered, control is passed to operation 670 and method 600 continues. If it is determined in operation 660 that an information seeker has not entered a valid login credential(s) a notification may be sent to the information seeker, the associated databases 250 and/or 255 are updated, control is passed to operation 605 and method 600 continues. The determination of invalid authentication credentials in operation 660 may be based on multiple conditions. For example, if the system times-out waiting for the user to take action, the database may reflect this and simply return to wait for another query to be received. In another case, the system may detect that the number of attempts to validate credentials has exceeded a threshold count allowed by the system. The system may bar a username from accessing the affiliate group until action is taken by system administrator(s) based on the update to the authentication database 245.

In operation 625 a selection of an interest group(s) is made by the search system 225 (FIG. 2). The selection of an interest group(s) may be based on any selection method determined by the system. Any information contained in the affiliate group database 255 (FIG. 2) and/or the search database 250 may be used. For example, based upon information associated with a query including keyword(s), category(ies), profile(s), etc. interest groups may be ranked and an interest group may be selected based upon ranking, rating, availability, etc. of a searcher(s) and/or the affiliate group. In at least one embodiment, the same criteria as that used to order the list presented to an information seeker in operation 640 is utilized, and information seeker selections may be used to modify the system criteria for selection of an interest group. Control is passed to operation 655 and method 600 continues.

In operation 670 a determination is made whether an information seeker may be presented with an option to select a searcher(s) to provide a search result(s) for a query. If in operation 670 it is determined that an information seeker may be presented an option to select a searcher(s) to provide a search result(s) a notification may be sent to an information seeker, control is passed to operation 675 and method 600 continues. If in operation 670 it is determined that an information seeker may not be presented with an option to select a searcher(s) to provide a search result(s) a notification may be sent to an information seeker, control is passed to operation 680 and method 600 continues.

The determination in operation 670 may be based on multiple criteria. For example, if the selected interest group criteria might present personally identifiable information of the searcher, searcher selection might not be allowed, or if there is reason to suspect that a user and/or searcher are "gaming" the search system for compensation, or for any other reason, the option to select a searcher(s) may not be available.

In operation 675 a list of eligible searcher(s) is presented to an information seeker. The list may be presented in a GUI such as that illustrated in FIG. 14. The list of eligible or available searchers presented to an information seeker may be presented in any order determined by the search system 225 (FIG. 2). The list may presented in an order determined by a ranking method based upon information contained in the search database 250 and/or the affiliate group database(s) 255 and/or other data accessible by the search system 225. In a preferred embodiment, the list is limited to a predetermined number of searchers and the order of presentation is from highest to lowest rated eligible searcher based on the method determined by the search system 225. Control is then passed to operation 685 and method 600 continues.

In operation 685 a determination is made whether an information seeker has selected a searcher(s) to provide a search result(s) for a query. If in operation 685 it is determined that an information seeker has not selected a searcher(s), control is passed to operation 680 and process 600 continues. The determination that an Infoseeker™ has not selected a searcher(s) may be made actively (e.g., the user clicked on the "auto select" button 1440 (FIG. 14)) or passively (e.g., the user times-out). If in operation 685 it is determined that an information seeker has selected a searcher(s) to provide search result(s) for a query control is passed to operation 690 and method 600 continues.

In operation 680 a searcher(s) to provide a search result(s) to a query is selected by the search system 225 (FIG. 2). The selection of an eligible or available searcher may be based upon any criteria determined by the search system 225 (FIG. 2). In a preferred embodiment, the criteria for selection of a searcher(s) by the system is that used to rank the list of searchers presented to an information seeker for selection of a searcher(s) in operation 675, and the selection criteria may be modified based upon the selection by an information seeker. The search database 250 and affiliate group database(s) 255 are updated and control is passed to operation 690 and operation 600 continues.

In operation 690 a determination is made whether a user is required to have a valid set of credentials to submit an information query to a selected searcher(s). If it is determined in operation 690 that a valid set of credentials is not required, control is passed to operation 697 and method 600 continues. If in operation 690 it is determined that a valid set of credentials is required to submit a query to a selected searcher(s) a notification may be sent to an information seeker, control is passed to operation 695 and method 600 continues.

In operation 695 a verification similar to that in operation 660 is performed. If in operation 695 it is determined that a valid set of credentials has been provided, control is passed to operation 697 and method 600 continues. If in operation 695 it is determined that a valid set of login credentials has not been provided the associated database(s) 250 and/or 255 are updated, control is passed to operation 605 and method 600 continues. The determination of invalid authentication credentials in operation 695 may be based on multiple conditions. For example, if the system times-out waiting for the user to take action, the database may reflect this and simply return to wait for another query to be received. In another case, the system may detect that the number of attempts to validate credentials has exceeded a threshold count allowed by the system. The system may bar a username from accessing the affiliate group until action is taken by system administrator(s) based on the update to the authentication database 245.

In operation 697 a query is submitted to a searcher(s) and control is passed to operation 698 and method 600 continues.

In operation 698 a determination is made as to whether a search result(s) is returned. If a search result(s) is not returned, method 600 waits for a search result(s) to be returned. If a search result(s) is not returned within a predetermined amount of time, the method 600 times out and control is passed to operation 605 and method 600 continues. If in operation 698 it is determined a search result(s) is returned, a rating process may be performed by any method(s) including voting, review by searcher(s), user rating, etc. The search and affiliate database(s) 250, 255 (FIG. 2) are updated, control is passed to operation 699 and method 600 continues.

In operation 695 a determination is made whether a user is logged-in. If it is determined that the user is not logged-in, control is passed to operation 601 and method 600 continues. If in operation 695 it is determined that a user is logged-in, control is passed to operation 602 and method 600 continues. In operation 601 the search result(s) may be posted to a bulletin board, or other record in the search database 250 (FIG. 2) to be presented to the Infoseeker™ at the next login, the database(s) 250, 255 are updated, control is passed to operation 605 and method 600 continues. In operation 602 the search result(s) may be presented to the user, the databases

250, 255 (FIG. 2) are updated, control is passed to operation 605 and method 600 continues.

While method 600 has been described in the context of a real-time selection of a searcher(s) and/or interest group(s) by an information seeker(s) for a query, it will be immediately obvious to one of ordinary skill in the related art that a selection of a searcher(s) and/or interest group(s) may be used to provide a search result(s) stored by the search system 225. That is, a search result(s) provided by members of an affiliate group may be provided for a query(ies) without the use of a human searcher(s).

In at least one embodiment of the disclosed systems and methods, a user who wishes to query an affiliate group may be required to download a software application other than a web browser or thin client. In particular, an application such as the ChaCha® Guide Application, disclosed in U.S. application Ser. No. 11/647,286 by Jones, et al. entitled, "Automated Tool for Human Assisted Mining and Capturing of Precise Results", filed Dec. 29, 2006 and incorporated herein by reference, might be utilized to access a secure system.

Figure 7:
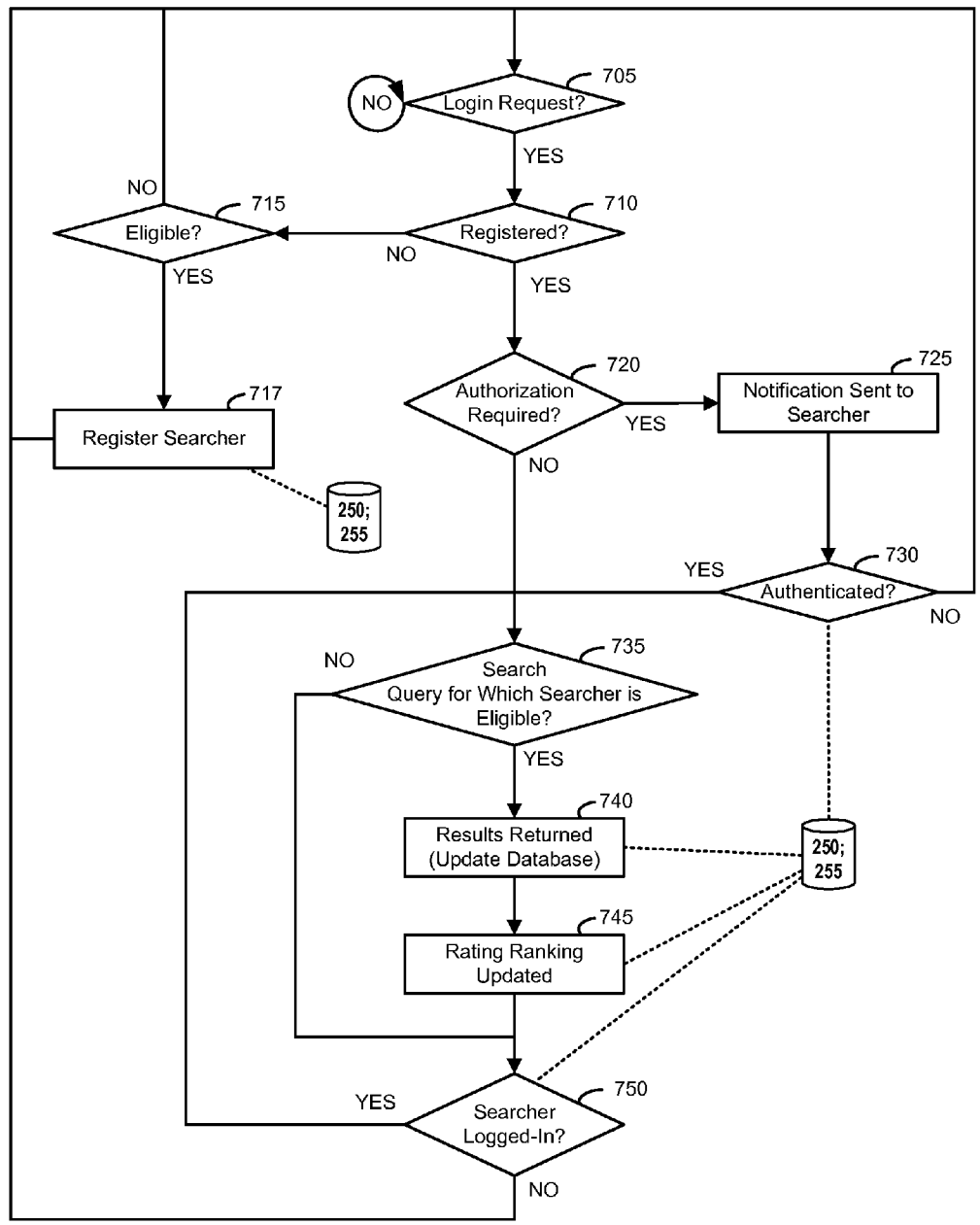
FIG. 7 is a flow diagram depicting a method of operation.

In FIG. 7, a method 700 for login by a searcher as a member(s) of an affiliate group is provided.

Method 700 begins with operation 705. In operation 705 a determination is made as to whether a searcher login request by a member of an affiliate group has been received. If in operation 705 it is determined that a searcher login request has not been received, method 700 continues to wait for a login request. If in operation 705 it is determined that a searcher login request has been received, control is passed to operation 710 and method 700 continues.

In operation 710 a determination is made whether a searcher has registered with the search system 225 (FIG. 2) as a member of an affiliate group. If in operation 710 it is determined that a searcher has not registered as a member of an affiliate group, a notification may be sent to a searcher and control is passed to operation 715 and method 700 continues. If in operation 710 it is determined that a searcher has registered as a member of an affiliate group, control is passed to operation 720 and method 700 continues.

In operation 715 a determination is made as to whether a searcher is eligible to register as a member of an affiliate group. If it is determined that the searcher is not eligible, control is passed to operation 705 and method 700 continues. If it is determined in operation 715 that a searcher is eligible to register as a member of an affiliate group, control is passed to operation 717 and method 700 continues.

In operation 717 a searcher is registered as a member of an affiliate group as further described herein, databases 250, 255 are updated, control is passed to operation 705 and method 700 continues.

In operation 720 a determination is made whether a searcher is required to provide a valid credential(s) in order to access resource(s) and/or provide a search result(s) for a query(ies) directed to an affiliate group(s). If in operation 720 it is determined that a searcher is required to provide a valid credential(s) to access resource(s) and/or provide a search result(s) control is passed to operation 725 and method 700 continues. If in operation 720 it is determined that a searcher is not required to provide a valid credential to access resource(s) and/or provide a search result(s) for a query(ies) directed to an interest group, control is passed to operation 735 and method 700 continues.

In operation 725 a notification may be sent to a searcher to allow a searcher to provide a valid credential(s) to access resource(s) and/or provide a search result(s) for a query(ies) directed to an affiliate group(s). The validation request may be presented in a searcher login GUI such as that illustrated in FIG. 15, which is further described herein. Control is passed to operation 730 and method 700 continues.

In operation 730 a determination is made whether a valid credential is presented by a searcher to access resource(s) and/or provide a search result(s) for a query(ies) directed to an affiliate group. If in operation 730 it is determined that a searcher has presented a valid credential the database is updated and control is passed to operation 735. If in operation 730 it is determined that a searcher has not provided a valid credential the databases 255, 250 are updated, control is passed to operation 705 process 700 continues. The determination of invalid authentication credentials in operation 730 may be based on multiple conditions. For example, if the system 225 times-out waiting for the searcher to take action, the databases may reflect this and simply return to wait for another login request to be received. In another case, the system may detect that the number of attempts to validate credentials has exceeded a threshold count allowed by the system. The system 225 may bar a username from accessing the affiliate group until action is taken by system administrator(s) based on the update to the databases 250, 255.

In operation 735 a determination is made whether a there is a search query for which a searcher is eligible to produce a search result(s). If it in operation 735 it is determined that there is a query for which a searcher is eligible to produce a search result(s) control is passed to operation 740 and method 700 continues. If in operation 735 it is determined that there is no query for which a searcher is eligible to produce a search result(s) control is passed to operation 750 method 700 continues.

The determination in operation 735 may be based upon any information associated with a searcher and/or a search query. For example, a searcher may be determined to be eligible to provide a search result(s) for a query which has been directed to any member of an interest group for which a searcher has registered, a query which has been directed to the searcher, etc. Likewise, a searcher may be determined not be eligible to provide a search result(s) for a query directed to an interest group for which a searcher has registered due to information associated with a query. For example, a query may be directed to a higher rank/rating, a specialized skill set may be associated with a query, an immediate reply may be required and a searcher is not available due to any reason, etc.

In operation 740 a searcher performs an information search and returns a search result(s) for a query for which a searcher is eligible. Search resource(s) available to a searcher may be under access restriction based upon information associated with a searcher in the search database 250 (FIG. 2), If a search result(s) is provided, the search database 250, and/or affiliate database(s) 255 are updated and a search result(s) may be sent to an information seeker. Control is passed to operation 745 and method 700 continues.

In operation 745 a rating and/or ranking of a searcher(s), and/or an affiliate group(s) may need to be updated due to receiving rating(s) and/or ranking(s) of a search result(s) provided by a searcher(s). If a rating or ranking of a search result(s) has been received, the search database 250 and/or affiliate database(s) 255 are updated, control is passed to operation 750 and method 700 continues. A rating(s) and/or ranking of a search result(s) may be produced by methods described herein and/or in the related Provisional Application U.S. Ser. No. 60/913,944 previously mentioned. In at least one embodiment, an information seeker may be requested to provide a rating of a search result(s) when it is received.

In operation 750 a determination is made as to whether a searcher is still logged-in to the search system. If it is determined that a searcher is still logged-in to the search system, control is passed to operation 735 and method 700 continues. If it is determined that a searcher is not still logged-in to the search system, databases 250, 255 (FIG. 2) are updated, control is passed to operation 705 and method 700 continues.

A search result(s) and/or a search query may be transmitted via any communication method, including wireless transmission, wired transmission, e-mail, via the network 220 (FIG. 2), or from any suitable computer system.

FIG. 8 illustrates an example of a searcher or guide registration web page 800 designed and configured to allow a prospective guide to enter information for registration as a guide with the search system 225 (FIG. 2). As illustrated in FIG. 8, for example, the searcher registration page 800 may be divided into the account information section 805, the personal information section 810 and the terms of service section 815. The account information section 805 and the personal information section 810 each may include a plurality of text boxes and/or drop-down lists for entry of data associated with a guide. A user ID text box 820 is provided for input of user ID information regarding a searcher whose user ID may be utilized as a screen name for the guide within the search system. The user ID may be automatically populated with a standardized form of user ID by utilizing data input in the personal information section 810. In the illustrated example for instance, the user ID may for example, be automatically generated by selecting the first letter of the text string entered in the first name text box 840 and the text string entered in the last name text box 844 in the personal information section 810 and an appended string if required to differentiate the user ID from existing user IDs.

The registration web page may also include the password text box 825 and the password confirmation text box 830 wherein a prospective guide enters a password and confirms the entered password that will be utilized when logging in to the search system 225 (FIG. 2). The account information section 805 of the registration page may also include an e-mail text box 835 for entry of the prospective guide's e-mail address, as shown in FIG. 8.

The personal information section 810 may include the first name text box, 840, the middle initial text box 842 and the last name text box 844 for entry of the name of the prospective searcher. As shown in FIG. 8, the personal information section 810 may include a phone number text box 846 for entry of a phone number of a prospective guide. Preferably the phone number text box requires entry of a ten-digit number including area code. The area code entered in the phone number text box 846 may be utilized to establish a geographic location of a guide, which geographic location may be utilized in the process for selecting a guide(s) eligible to respond to a query(ies) submitted by an information seeker. Multiple address text box lines 848, 850, a city text box 852, a state text box 854 and a postal or postal code text box 856 may be provided for entry of address information by the prospective searcher. Address information may also be utilized to establish a geographic location for a guide which location information may be utilized in a process for selecting a guide(s) eligible to respond to a query(ies) submitted by an information seeker(s).

The registration web page may also include a date of birth text box 858 and a text box or preferably a drop-down list 860, whereby the prospective searcher may list or select his or her gender. Along with geographic location data, date of birth and gender data may be utilized in a process(es) for determining if a guide is eligible to provide a search result(s) for a query(ies) submitted by an information seeker(s). For instance, if a twenty-five year old female information seeker from Palo Alto, Calif. submits a query such as, "What hotel locally has the best dance club?", the software running on the search system 225 (FIG. 2) may select available female searchers between the ages of twenty-one and thirty registered for travel related keywords having a familiarity with hotels in the Silicon Valley to provide a search result(s). Alternately, the software may prompt an information seeker(s) to request that a query be answered by searchers who are members of an affiliate group associated with travel. (e.g., flight attendant(s) for an airline(s)).

The registration page 800 may include one or more affiliation selection drop-down list boxes 864 populated with a list of available affiliate groups to permit a prospective guide to indicate affiliate groups with which he or she may be associated. In one embodiment, an affiliate group may elect to provide a search box on an affiliate group web page so that queries presented via the web page may be directed if possible to members of the affiliate group. In this embodiment, the registration web page to which a link in an invitation e-mail directs a prospective searcher may pre-populate the affiliations box 864 with the name of a sponsoring affiliate group. In one embodiment, a prospective searcher will not be permitted to indicate affiliation with one or more groups when directed to a registration page via an e-mail invitation generated by an affiliate group request. In other embodiments, a prospective searcher having received an invitation to register with the search system may be able to select one or more affiliate groups in which he or she may be a member. Upon indicating membership in an affiliate group, the search system may generate a pop-up window (e.g., the GUI in FIG. 15) requesting information to validate a prospective searchers membership in a selected affiliate group. Such information may include a user ID and/or a user password for an affiliate group. Any type of membership authentication information may be requested within the scope of the disclosure.

The registration page 800 may include the areas of interest check boxes 862 populated with a list of a plurality of interest areas to permit prospective searchers to indicate areas that may be of interest, familiarity, expertise, etc. The selections of the areas of interest check boxes 862 may be extracted from the registration page 800 and stored as data, such as in an interest group searcher record, in the databases 250, 255. The registration page 800 may also include the internet connection speed text box 863. The internet connection speed text box is preferably a drop-down list of internet connection speeds to permit a prospective searcher to indicate the speed at which he or she will connect to the system. This data may be stored in the database 250 and/or database(s) 255.

As explained in greater detail in U.S. application Ser. No. 11/777,505, entitled, "Method and System for Qualifying Keywords in Query Strings", by Jones, et al, filed on Jul. 13, 2007 incorporated by reference herein, prospective searchers register with the search system to search based on categories or keywords associated with the query presented by the information seeker. In at least one embodiment of registration page 800, three drop down lists 866, 868 and 870 as illustrated in FIG. 8A, are displayed for selecting categories or keywords for which the prospective searcher desires to conduct searches. It is within the scope of the disclosure for fewer or more category or keyword registration boxes to be presented on the searcher registration page 800. When registering in response to an e-mail from an affiliate group sponsor, the available categories and keywords contained in the drop down lists 866, 868 and 870 may reflect affiliate specific keywords and categories reflecting the taxonomy selected by the affiliate group.

The terms of service section 815 (FIG. 8) may include a scrollable text box 872 containing text setting forth the conditions, terms rules and/or regulations applicable to registered searches with the search system. The check boxes 874 agreeing to the terms, conditions, rules and regulations set forth in the text box 872 may be provided whereby a prospective searcher may indicate willingness to comply with the terms and conditions set forth in the text box 872. Upon providing any data required for registration with the search service, a prospective searcher may click on the continue button 895 or may otherwise indicate completion of the web form for registration. The search service may extract information from the registration web page 800 and may store such data in the search database and/or affiliate database 250, 255 (FIG. 2).

While the above described registration web page 800 requests the above identified data, it is within the scope of this disclosure for any information to be requested in order to register as a searcher with the search system. It is also within the scope of this disclosure for the information requested for registration as a searcher to be acquired by other means such as by accessing cookies and information stored on the prospective user's computer system, via a database dump from an affiliate group database, via etc. One of ordinary skill in the relevant art will immediately recognize that while, text boxes, drop down lists and check boxes are illustrated as being generated on the registration web page 800 to facilitate acquisition of required information from the searcher, other data input structures may be utilized for such purpose. Information such as ethnicity, religious affiliation, institutes of higher learning attended, degrees earned, areas of study, etc. may be requested to determine a demographic profile of a searcher(s).

Any information acquired from a prospective searcher(s) in the registration process may be utilized to populate the fields of the affiliate group searcher database 240 (FIG. 2).

In one embodiment, the affiliate group may select to have a search window 910 (FIG. 9) driven by the search system 225 (FIG. 2) displayed on the affiliate group's home web page 900. The specific example illustrated in FIG. 9 includes the affiliate group web page 900 of an airline which includes a search window 910 that indicates that a query regarding travel destinations may be submitted directly in a text box 920 of the search engine window, which query will be answered by an employee of the affiliate group. The search engine window also includes an activation button 930 that when selected by the information searcher causes the search system to generate a search page 1000 as shown, for example, in FIG. 10 to be displayed on the information seeker computer system 230 (FIG. 2).

Figure 10:
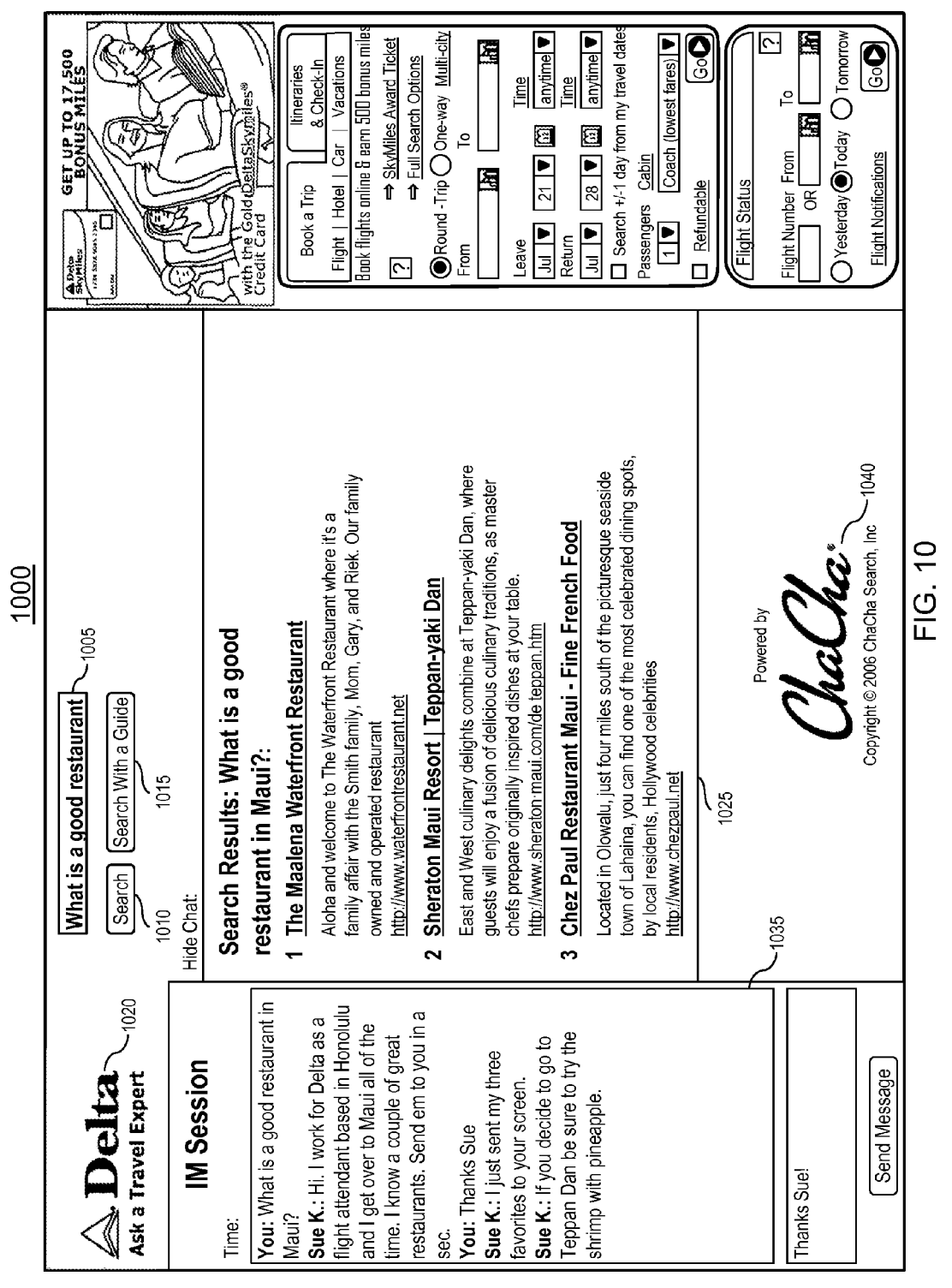

Referring to FIG. 10, the search page 1000 generated upon selecting the activation button 930 (FIG. 9) in the search engine window 910 presented on an affiliate group's web page (e.g., affiliate group web page 900), includes a plurality of panes and icons. Search page 1000 includes a query box 1005, a search button 1010, a search with guide button 1015, an affiliate branding icon 1020, a search results window 1025, an advertising window 1030, a chat window 1035 and a search system branding icon 1040. When access to the search page is gained by clicking the activation button 930 in the search window 910 on the affiliate group web page 900, the query box 1005 includes the query entered in the query box 920 on the affiliate group web page 900. By clicking the search button 1010 the information seeker can search without using a registered searcher. In one embodiment, search results presented in the search results window 1025 when the search is conducted without a guide are results generated utilizing the resources that have been utilized in the past by searchers responding to queries containing the same and/or similar keywords as is contained in the information seekers current query. In one embodiment, when the user clicks the search button 1010, the results presented in the search results window 1025 are results presented by registered searchers in response to previous queries with regard to the keywords associated with the current search. The results are retrieved from the search database 250 (FIG. 2) which may be a subcomponent of the affiliate group databases 255. If an information seeker clicks the search button 1010, the chat window 1035 may be hidden, as there is no need for chatting with a searcher. In one embodiment, however, the chat window may be utilized following the search button 1010 being clicked in an effort to clarify any ambiguity regarding the keyword or category to which a query relates.

When the search with guide button 1015 is clicked, an information seeker may be presented with a window including information regarding an available guide(s) (see FIG. 14) so that the information seeker can select a specific guide and/or guide profile to answer a query as described above. Alternatively, a searcher who is tasked with responding to a query may be automatically assigned by the search system 225 (FIG. 2) as further described herein. Once a guide(s) is selected or assigned to respond to a query, a guide and the information seeker may communicate in real time utilizing the chat window 1035. This real time communication may be utilized to clarify any ambiguities in the query or to provide a positive impression of the guide and or the affiliate group with which the guide is associated to the information seeker. The guide may also select advertisements for display in the advertising window or the advertisements may be selected automatically by the search system 225 based on an analysis of the query. The selection of targeted advertising and the benefits from providing targeted advertising are explained more fully in U.S. application Ser. No. 11/777,505 previously mentioned.

Once on the search page 1000, an information seeker can elect to do additional searching by following links presented in the results window, entering a new query in the query box 1005 or can follow the advertising links presented in the advertising window. In one embodiment, the search system icon 1040 when clicked provides a link to the URL of the search system providers search page, which is similar to the search page shown in FIG. 10 absent the affiliate group icon 1020.

The example of the affiliate group web page 900 (FIG. 9) and the affiliate group search page 1000 (FIG. 10) described above is an example of affiliate group searching wherein the information seekers are unconstrained, i.e. any information seeker navigating to the affiliate group web page 900 can utilize registered searchers associated with the affiliate group to aid them in finding results responsive to a query. In the above example, in one embodiment, the searchers available for aiding the information seeker in finding results responsive to their query is constrained to registered searchers associated with the affiliate group. In an alternative embodiment, of the above example, searchers associated with the affiliate group may receive preferential treatment and be assigned the task of responding to the information seekers query when such a searcher is available and eligible or qualified to respond to a query, but other eligible searchers may be assigned to respond to a query if a searcher associated with the affiliate group is not available or eligible to respond to a query.

In certain non-illustrated embodiments, the information seekers may be from a constrained group and the registered searchers available for aiding the information seeker may be from a constrained group. One example of such an embodiment is when an affiliate group dealing with highly confidential or classified information elects to provide a search window on their affiliate group web page driven by the search provider which web page can only be accessed by authorized personnel of the affiliate group and which only allows registered searchers associated with the affiliate group to act as guides in aiding the information seeker in obtaining a response to their query.

Using the "Audubon Society" (illustrated as affiliate group A 105 (FIG. 1)) in the example above, the list of authorized guides in the sample authorization record (see FIG. 5) might exclude searcher A1 110 (e.g., "Bill Birdsong") from accessing the database of "Rare and Endangered" species. Access might be controlled by creating a separate interest group record (see FIG. 3 and FIG. 5A) with a different interest group ID 305, or by associating the resource(s) with a keyword which indicates that "Bill Birdsong" is not an authorized searcher.

Those of ordinary skill in the relevant art based on the disclosure can readily envision situations in which the information seekers may be constrained to information seekers authorized by an affiliate group while the pool of registered searchers is not constrained. For example, an affiliate group might require that users establish a login and/or user profile in order to utilize the services of the group so that better service might be provided. In this case the affiliate group might provide speech-based services, and bill a user according to time used. However, due to the dynamic demand for guides, the affiliate group might permit any guide registered to the search system 225 and associated with the affiliate group to provide services to an information seeker. Using the airline example above, an established user profile with credit information might be stored in a database of the airline company. That information might be inaccessible to searchers, but the flight reservation network would be available to any searcher signed-up for the "Delta® Air Lines" affiliate group with preference being given to the employees, but utilizing other members during peak demand.

Figure 11:
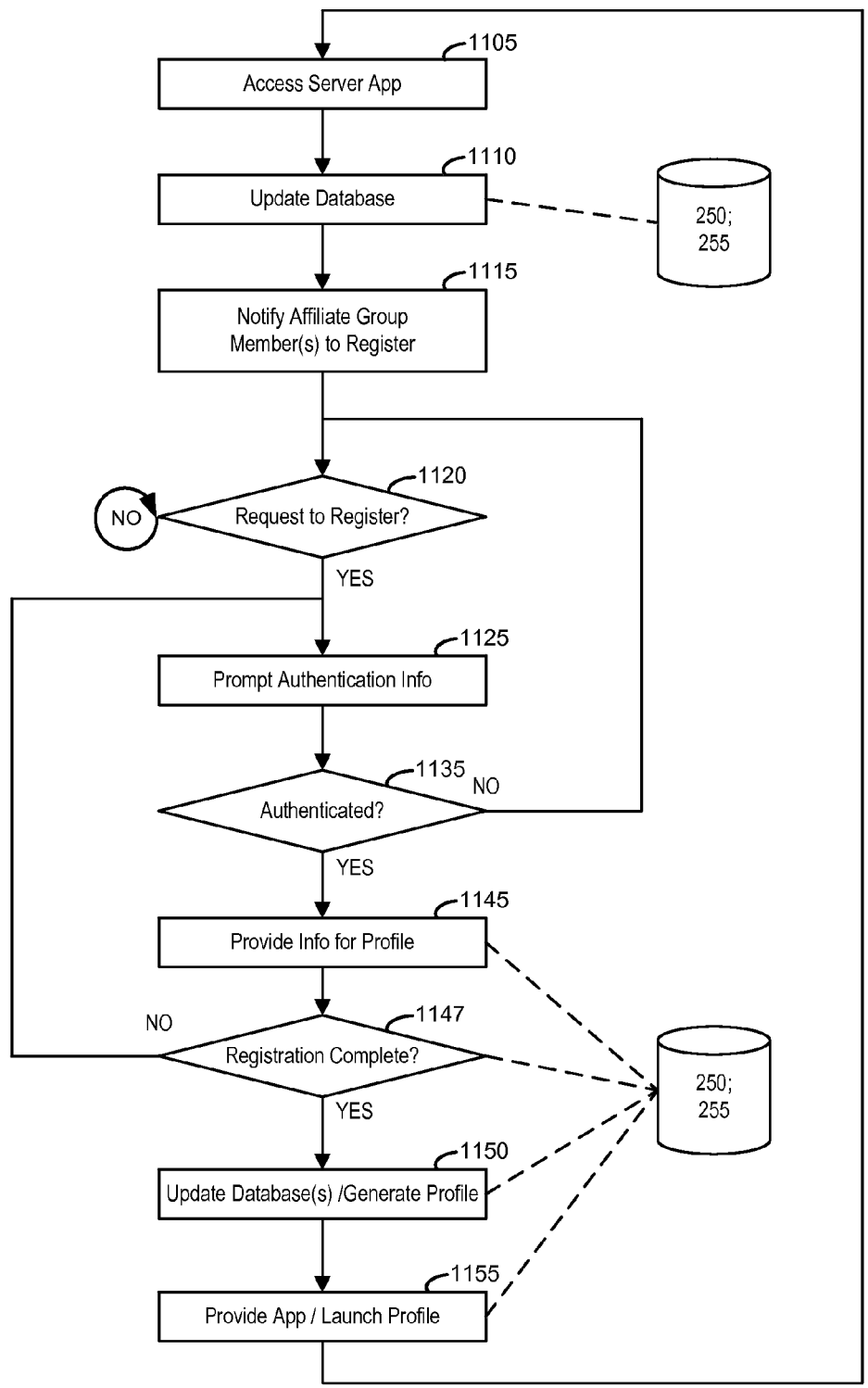
FIG. 11 is a flow diagram of a registration process.

In FIG. 11 a method 1100 is provided for recruitment and registration of members of an affiliate group.

When an affiliate group elects to be recognized as an affiliate group by the search system provider, a server application is activated for the affiliate group in operation 1105. This application may allow the affiliate group to establish business rules, perform set-up activities, etc. Control is passed to operation 1110 and method 1100 continues.

In operation 1110 an affiliate group system administrator may provide information regarding affiliate members for the affiliate group databases 255 (FIG. 2). This may include e-mail, IM credentials, mobile device contact parameters (e.g., phone number, etc.), personal website URL, or other contact information for group members. Further, the affiliate group may provide authentication information, authorization information, search result(s), query information, resource access information, training materials, keyword/category data, rating data, etc. which may be stored in the search and/or affiliate databases 250, 255. Control is passed to operation 1115 and method 1100 continues.

In operation 1115 an e-mail (or other suitable notification) is sent to affiliate group members notifying them to register. Such a notification may for example contain a link to a registration web page such as the registration page 800 (FIG. 8) and may contain a cookie and/or other indicia that the affiliate group is to be considered as a sponsor of a searcher who registers with the search system utilizing a link in the notification. Notification might take other forms, such as IM as further described in the related U.S. application Ser. No. 11/647,309 entitled, "Instant Message Notification of Service Providers", by Jones, et al., filed Dec. 29, 2006 which is incorporated herein by reference. Designation as a sponsor may entitle an affiliate group to receive compensation based on activities of searchers whom they sponsor. This aspect of the disclosure is particularly useful in generating revenues for the affiliate group and provides an incentive for affiliate groups to elect to be registered as such by the search system provider(s). Control is passed to operation 1120 and method 1100 continues.

In operation 1120, a determination is made as to whether an affiliate group member elects to register as a searcher with the search system 225 (FIG. 2), for example, by clicking on a link provided in the invitation notification to direct the affiliate group member web browser to a registration page. If it is determined that an affiliate does not elect to register, method 1100 continues to wait. If it is determined that an affiliate does elect to register as a guide, control is passed to operation 1125 and method 1100 continues.

In operation 1125, an affiliate group member may access a registration page of the search system. An affiliate desiring to register as a searcher is prompted to enter a user ID, username, and/or password, etc., which may be based on information in for example the searcher username field 415 and/or the searcher verification code field 420 of an interest group searcher record (see FIG. 4) or alternately in the authorized searcher(s) ID, authorized searcher(s) username, and/or authorized searcher(s) password fields 525, 530, 535 of an authorization record (see FIG. 5) associated with the interest group ID assigned to the affiliate group.

In operation 1135 a determination is made as to whether the authentication information provided by the affiliate is valid based upon authentication information, for example, provided by the affiliate group administrator, such as in operation 1110. If in operation 1135 it is determined that valid authentication information has been presented control is passed to operation 1145 and method 1100 continues. If it is determined in operation 1135 that the information is not valid, control is passed to operation 1120 and method 1100 continues.

The determination of invalid authentication credentials in operation 1135 may be based on multiple conditions. For example, if the system 225 times-out waiting for the affiliate to take action, the databases may reflect this and simply return to wait for another request to register to be received. In another case, the system may detect that the number of attempts to validate credentials has exceeded a threshold count allowed by the system. The system 225 may bar a username from accessing the affiliate group until action is taken by system and/or affiliate group administrator(s) based on the update to the databases 250, 255.

In operation 1145 an affiliate group member may provide information to create and/or enhance a profile associated with the searcher. Control is passed to operation 1147 and method 1100 continues.

In operation 1147 a determination is made whether a searcher has indicated completion of registration. If it is determined that a searcher has indicated completion of the registration process, the search database 250 and the affiliate databases 250 are updated, control is passed to operation 1150 and method 1100 continues. If it is determined in operation 1145 that a searcher has not completed registration, the databases 250, 255 are updated, control is passed to operation 1125 and method 1100 continues. The determination of incomplete registration in operation 1147 may be made according to conditions defined by the system provider(s), such as the registrant terminating a session, exceeding a preset time limit, etc.

In operation 1150, the search system 225 updates the databases 250, 255 with the provided information and generates a user profile for the affiliate member who is now considered a registered searcher. The search system may generate a welcome e-mail and/or other notification containing a link to download a guide application to the newly registered searcher associated with the affiliate group. Control is passed to operation 1155 and method 1100 continues.

In operation 1155 a newly registered searcher associated with an affiliate group may download an application such as the ChaCha® Guide Application and may be directed to a profile page. The newly registered searcher is then available to provide a search result(s) to information seekers in response to queries for which they have requested a guide associated with the affiliate group. Control is then passed to operation 1105 wherein an affiliate group administrator may provide further information for registration of affiliate group members.

An exemplary GUI for a user and/or guide to select an affiliate group is illustrated in FIG. 12. The GUI 1200 includes an advertising window 1205, an interest group selection menu 1210, action buttons 1215, an interest group rating and/or membership indicator window 1220, a graphics window 1225, a query box 1230, and a system identifier 1235.

The advertising window 1205 may be used to present any form of advertising which has been determined to be suitable based on information preferably associated with a query. The advertising window 1205 may include advertisements associated with one or more of the available affiliate groups, to promote the services of the affiliate. Advertisements may be based upon profile data selected in the interest group selection menu 1210, information related to the query the query box 1230, or any other information available to the search system 225.

The interest group selection menu may 1210 may include a list of available affiliate search groups and other controls for selection of an affiliate group by a user and/or guide. For example, the selection boxes might be drop-down menus which could allow the guide and/or user to select a profile, a list of categories and/or keywords, etc., to allow selection of a relevant interest group for investigation and/or use.

The action buttons 1215 may be used by an information seeker to accept or cancel the option to select an affiliate search group. Likewise the action buttons may be used by a guide to indicate a request to become a member of the designated interest group, or to cancel such a request.

The interest group rating and/or membership indicator window 1220 may contain information regarding a selected affiliate group(s). For example, a count of groups available for a given query and/or profile might be displayed. Alternately a drop-down menu might list the interest groups, respective ratings, exemplary result(s), etc.

The graphics window 1125 may be used to present graphical data regarding relationships between affiliate groups. Comparisons of selected interest groups based on criteria such as queries handled, ratings of results, number of members, relationships between members of the selected interest group and other groups (e.g., common members), etc.

The query box 1230 may contain an original query submitted by an information seeker, or may contain a query entered by a guide in order locate a relevant interest group to join. The query box may further allow the guide and/or the information seeker to refine the query as further described in the related U.S. application Ser. No. 11/777,505 previously mentioned.

The system identifier 1235 may optionally appear to identify the system provider and/or the user and/or the guide and/or affiliate group as illustrated.

An exemplary GUI 1300 for a user to select an interest group based upon a query is illustrated in FIG. 13.

The GUI 1300 may contain a query box 1310, an interest group list box 1320, action buttons 1330, an auto selection button 1340, an advertising window 1350, and a system message window 1360.

The query box 1310 may contain a query entered by an information seeker. The query box may allow a user to modify an original query as previously described with respect to FIG. 12.

The interest group list box 1320 may contain the identifier of a target interest group. It may further comprise a drop-down list of alternate affiliate groups available for the query. It may further display or open a window listing more detailed information of available interest groups.

The action buttons 1330 allow the user to take actions based on information presented in the GUI 1300. For example, the "accept" button might trigger selection of the target interest group to respond to a query. The "change" button might allow a user to access a more detailed selection GUI such as that described with respect to FIG. 12. The "cancel" button may allow an Infoseeker™ to restore the original data in the GUI 1300 and discard any modifications. While certain functions have been described, including alternate action buttons or the equivalent will be immediately obvious to one of ordinary skill in the relevant art.

The auto selection button 1340 allows the user to decline to select an interest group and allows the system 225 (FIG. 2) to make the selection even if the option is offered to the user.

The advertising window 1350 may present various types of material to the user as previously described. Multiple advertising windows may be included in the GUI 1300.

The system message window 1360 may allow the system to send any message to the user, regarding topics such as user ID, system ID, etc.

An exemplary searcher selection GUI 1400 is presented in FIG. 14.

The searcher selection GUI 140Q operates similarly to the interest group selection GUI 1300. The GUI 1400 may be used to select a specific searcher. In a preferred embodiment, the searcher and the user remain anonymous, as further described in the related U.S. application Ser. No. 11/779,502 entitled, "Anonymous Search System Using Human Searchers", by Jones, et al., filed Jul. 18, 2007 incorporated herein by reference.

The GUI 1400 may contain a query box 1410, a searcher list box 1420, action buttons 1430, an auto selection button 1440, an advertising window 1450, and a system message window 1460.

The query box 1410 may contain a query entered by the information seeker. The query box may allow a user to modify an original query as previously described with respect to FIG. 12.

The searcher list box 1420 may contain the identifier of a target searcher. It may further comprise a drop-down list of alternate searchers available or eligible for the query. It may further display or open a window listing more detailed information of available searchers.

The action buttons 1430 allow the user to take actions based on information presented in the GUI 1400. For example, the "accept" button might trigger selection of the target searcher to respond to a query. The "change" button might allow the user to access a more detailed selection GUI such as that described with respect to FIG. 12. The "cancel" button may allow an Infoseeker™ to restore the original data in the GUI 1400 and discard any modifications. While these functions have been described alternate action buttons or the equivalent will be immediately obvious to one of ordinary skill in the relevant art.

The auto selection button 1440 allows the user to decline to select a searcher and allows the system 225 (FIG. 2) to make the selection even if the option is offered to the user.

The advertising window 1450 may present various types of material to the user as previously described. Multiple advertising windows may be included in the GUI 1400.

The system message window 1460 may allow the system to send any message to the user, regarding topics such as user ID, system ID, etc.

Figure 15:
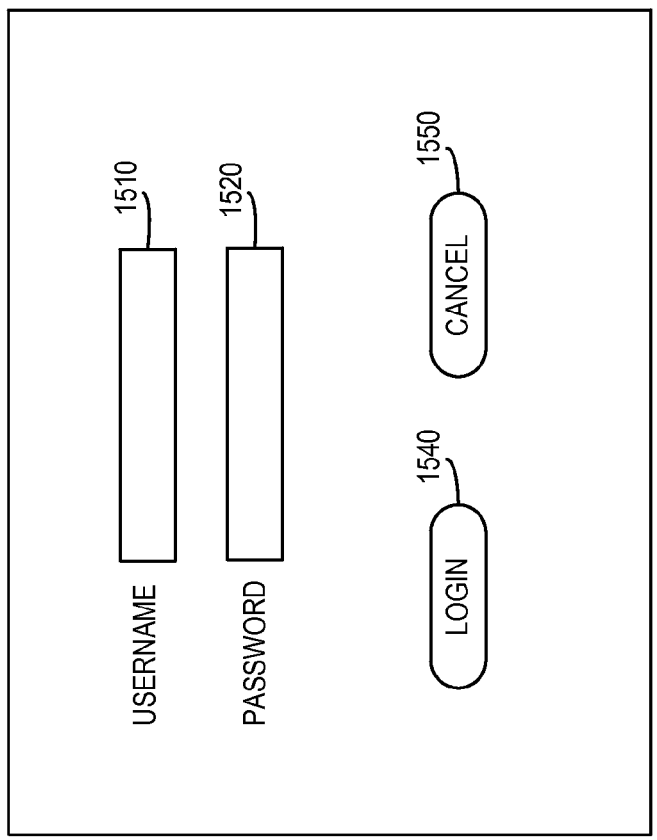
FIG. 15 is an illustration of a GUI.

Any or all of the elements of the GUI 1200, 1300, 1400 may alternately be suppressed in the display to reduce visual overload. Alternately, additional elements may be included in GUIs 1200, 1300, 1400 to allow for adequate user options An exemplary guide or user login GUI is illustrated in FIG. 15

The GUI 1500 may be presented to a guide or user when authentication information is required. The GUI may contain a username entry box 1510, a password entry box 1520, a login button 1540, and a cancel button 1550.

The username entry box 1510 allows a user and/or guide to enter a username for purposes of authentication. The password box 1520 allows a user and/or guide to enter a password or other information, such as a secure token ID or other one-time use item, activate biometric inputs, etc. as is well known in the published art.

The login button 1540 allows the user and/or guide to indicate completion of the authentication input process. The cancel button 1550 allows the user and/or guide to exit the GUI 1500 without attempting a login or verification of credentials.

The embodiments herein disclose a system and methods for providing affiliate group based search services. In various embodiments the system enables the users and/or the guides to be under authorization control, which may be useful not only for the applications described herein, but for any such applications wherein groups of human workers/searchers may provide information to information seekers/users. The embodiments herein may be applied to diverse system and businesses with such requirements.

After being presented with the disclosure herein, one of ordinary skill in the art will realize that the embodiments can be implemented in software, firmware, and/or a combination thereof. Program code according to the embodiments can be implemented in any viable programming languages such as C, C++, HTML, XHTML, JAVA or any other viable high-level programming language, or a combination of a high-level programming language and a lower level programming language.

The embodiments can also be in the form of a computer readable storage encoded with processing instructions for controlling a computer to implement the methods described herein according to embodiments.

The embodiments should not be limited to the embodiments described herein. After being presented with the disclosure herein, those of ordinary skill in the art would appreciate that changes may be made to the disclosed embodiments without departing from the spirit and scope of the embodiments.

What is claimed is:

1. A computer-implemented method for performing an information search, comprising:
    associating human searchers with a keyword;
    designating less than all the human searchers associated with the keyword as an affiliate group;
    selecting a human searcher;
    selecting the human searcher from the affiliate group when a request is authorized;
    selecting the human searcher from the human searchers associated with the keyword excluding the affiliate group when the request is not authorized;
    providing a search result of the human searcher;
    providing the search result using a search resource of the affiliate group when the request is authorized;
    obtaining the search result using a resource selected by the human searcher when the request is not authorized;
    obtaining an identifier of the human searcher;
    determining access rights of the human searcher based on the identifier;
    providing access to the search resource of the affiliate group when the access rights do not include the search resource of the affiliate group and the request is authorized; and
    providing access to public search resources selected by the keyword when the access rights include the search resource of the affiliate group and the request is not authorized;
    aggregating ratings of members of the affiliate group as a rating of the affiliate group;
    determining indicators of affiliate groups associated with the keyword in an order based on respective aggregate ratings of the members of the respective affiliate groups; and
    selecting the human searcher based on the rating.

2. The method of claim 1, comprising:
    ranking the affiliate group based on a collective rating of the affiliate group; and
    selecting the affiliate group from among the affiliate groups associated with the keyword based on the ranking.

3. The method of claim 2, comprising:
    determining the collective rating of the affiliate group based on ratings of search results of the affiliate group.

4. The method of claim 1, comprising:
    displaying to a user an indicator of a basis for the designating of the affiliate group.

5. The method of claim 2, comprising:
    determining a shared rating of the affiliate group based on a commercial agreement.

6. The method of claim 1, comprising:
    receiving an identifier of a source of the request; and
    designating the affiliate group based on the identifier of the source.

7. The method of claim 1, comprising:
    selecting a highest ranking human searcher for the keyword from a plurality of the members of the affiliate group; and
    providing a response of the selected human searcher as the search result.

8. The method of claim 1, comprising:
    registering the human searchers for the keyword and a category.

9. The method of claim 1, comprising:
    designating the affiliate group based on a shared affinity of the affiliate group.

10. The method of claim 1, comprising:
    designating the affiliate group based on a demographic of the affiliate group.

11. The method of claim 1, comprising:
    designating the affiliate group based on an approval by an entity of the human searchers of the affiliate group.

12. The method of claim 1, comprising:
    designating the affiliate group based on psychometrics of the human searchers.

13. The method of claim 1, comprising:
designating the affiliate group based on an affinity of a user submitting the request.

14. The method of claim 1, comprising:
designating the affiliate group based on an affinity presented to a user submitting the request.

15. The method of claim 1, comprising:
designating the affiliate group based on an affinity determined by a destination to which the request is directed.

16. A search system utilizing human searchers, comprising:
a processor;
a memory;
a searcher device performing a search responsive to a request;
a search system server receiving the request indicating a search is requested; associating human searchers with a keyword;
designating less than all the human searchers associated with the keyword as an affiliate group;
selecting a human searcher;
selecting the human searcher from the affiliate group when a request is authorized;
selecting the human searcher from the human searchers associated with the keyword excluding the affiliate group when the request is not authorized;
providing a search result of the human searcher;
providing the search result using a search resource of the affiliate group when the request is authorized;
obtaining the search result using a resource selected by the human searcher when the request is not authorized;
obtaining an identifier of the human searcher;
determining access rights of the human searcher based on the identifier;
providing access to the search resource of the affiliate group when the access rights do not include the search resource of the affiliate group and the request is authorized; and
providing access to public search resources selected by the keyword when the access rights include the search resource of the affiliate group and the request is not authorized;
aggregating ratings of members of the affiliate group as a rating of the affiliate group;
determining indicators of affiliate groups associated with the keyword in an order based on respective aggregate ratings of the members of the respective affiliate groups; and
selecting the human searcher based on the rating.

17. A non-transitory computer readable medium storing therein a program for causing a computer to execute an operation including providing human assisted searching, comprising:
associating human searchers with a keyword;
designating less than all the human searchers associated with the keyword as an affiliate group;
selecting a human searcher;
selecting the human searcher from the affiliate group when a request is authorized;
selecting the human searcher from the human searchers associated with the keyword excluding the affiliate group when the request is not authorized;
providing a search result of the human searcher;
providing the search result using a search resource of the affiliate group when the request is authorized;
obtaining the search result using a resource selected by the human searcher when the request is not authorized;
obtaining an identifier of the human searcher;
determining access rights of the human searcher based on the identifier;
providing access to the search resource of the affiliate group when the access rights do not include the search resource of the affiliate group and the request is authorized; and
providing access to public search resources selected by the keyword when the access rights include the search resource of the affiliate group and the request is not authorized;
aggregating ratings of members of the affiliate group as a rating of the affiliate group;
determining indicators of affiliate groups associated with the keyword in an order based on respective aggregate ratings of the members of the respective affiliate groups; and
selecting the human searcher based on the rating.

* * * * *